(12) United States Patent
Sahni et al.

(10) Patent No.: US 12,026,076 B2
(45) Date of Patent: Jul. 2, 2024

(54) METHOD AND SYSTEM FOR PROACTIVE CLIENT RELATIONSHIP ANALYSIS

(71) Applicant: Rimini Street, Inc., Las Vegas, NV (US)

(72) Inventors: Praveen Sahni, Union City, CA (US); Brian Slepko, Danville, CA (US); Craig Mackereth, Argyle, TX (US)

(73) Assignee: Rimini Street, Inc., Las Vegas, NV (US)

(*) Notice: Subject to any disclaimer, the term of this patent is extended or adjusted under 35 U.S.C. 154(b) by 658 days.

(21) Appl. No.: 16/570,432

(22) Filed: Sep. 13, 2019

(65) Prior Publication Data

US 2021/0081293 A1 Mar. 18, 2021

(51) Int. Cl.
| | |
|---|---|
| *G06Q 10/00* | (2023.01) |
| *G06F 3/04845* | (2022.01) |
| *G06F 9/54* | (2006.01) |
| *G06F 11/30* | (2006.01) |
| *G06N 7/01* | (2023.01) |

(Continued)

(52) U.S. Cl.
CPC ...... *G06F 11/3065* (2013.01); *G06F 3/04845* (2013.01); *G06F 9/542* (2013.01); *G06F 11/3006* (2013.01); *G06N 7/01* (2023.01); *G06N 20/10* (2019.01); *G06Q 10/063114* (2013.01); *G06Q 10/0639* (2013.01)

(58) Field of Classification Search
CPC .. G06F 11/3065; G06F 3/04845; G06F 9/542; G06F 11/3006; G06N 7/005; G06N 20/10; G06N 20/20; G06Q 10/063114; G06Q 10/0639; G06Q 10/06395; G06Q 10/06398; G06Q 30/01

See application file for complete search history.

(56) References Cited

U.S. PATENT DOCUMENTS

| | | |
|---|---|---|
| 6,704,410 B1 | 3/2004 | McFarlane et al. |
| 9,792,554 B2 | 10/2017 | Finch et al. |

(Continued)

FOREIGN PATENT DOCUMENTS

| | | |
|---|---|---|
| JP | H05-120300 | 5/1993 |
| JP | H11-296594 | 10/1999 |

(Continued)

OTHER PUBLICATIONS

Upstream Works Releases New Software That Personalizes the Contact Center Experience Wireless News [Jacksonville] Jul. 11, 2016 (Year: 2016).*

(Continued)

*Primary Examiner* — Gabrielle A Mccormick
(74) *Attorney, Agent, or Firm* — Hawley Troxell Ennis & Hawley LLP; Rivkah Young; Philip McKay

(57) ABSTRACT

A service provider system receives case data of a client from a client service system. Vector data is collected from the case data through integration and aggregation. Signals of anomalies or sentiments are detected through machine learning from the integrated and aggregated vector data. The signals are validated, consolidated and associated with case, contact, and client object types. A user interface presents the validated and consolidated signals to users who proactively take action based on the signals. The user interface includes dashboards, notifications, and indicators.

38 Claims, 16 Drawing Sheets

(51) Int. Cl.
*G06N 20/10* (2019.01)
*G06Q 10/0631* (2023.01)
*G06Q 10/0639* (2023.01)

(56) References Cited

U.S. PATENT DOCUMENTS

| | | | |
|---|---|---|---|
| 9,824,318 | B1 | 11/2017 | Lusthaus et al. |
| 9,824,323 | B1* | 11/2017 | Weiss ................. H04W 4/02 |
| 9,911,088 | B2 | 3/2018 | Nath et al. |
| 10,045,218 | B1 | 8/2018 | Stapleton et al. |
| 2002/0029161 | A1 | 3/2002 | Brodersen et al. |
| 2002/0198766 | A1 | 12/2002 | Magrino et al. |
| 2005/0149382 | A1* | 7/2005 | Fenner ................. G06Q 30/02 |
| | | | 705/7.32 |
| 2008/0103868 | A1 | 5/2008 | Santos et al. |
| 2008/0167930 | A1 | 7/2008 | Cao et al. |
| 2011/0184771 | A1 | 7/2011 | Wells |
| 2012/0020473 | A1 | 1/2012 | Mart et al. |
| 2013/0346067 | A1* | 12/2013 | Bhatt ................. G06F 40/30 |
| | | | 704/9 |
| 2014/0025418 | A1 | 1/2014 | Huang et al. |
| 2014/0096249 | A1 | 4/2014 | Dupont et al. |
| 2014/0112457 | A1* | 4/2014 | Xing ................. H04M 3/436 |
| | | | 379/32.01 |
| 2014/0279629 | A1 | 9/2014 | McConnell |
| 2014/0304279 | A1* | 10/2014 | Fuchs ................. G06F 16/2465 |
| | | | 707/750 |
| 2015/0051957 | A1* | 2/2015 | Griebeler ......... G06Q 10/06395 |
| | | | 705/7.41 |
| 2015/0242856 | A1* | 8/2015 | Dhurandhar ........... G06Q 50/01 |
| | | | 705/44 |
| 2015/0248630 | A1 | 9/2015 | Ramanan et al. |
| 2015/0254566 | A1 | 9/2015 | Chandramouli et al. |
| 2015/0310487 | A1* | 10/2015 | Xu ................. G06F 16/951 |
| | | | 707/706 |
| 2015/0332200 | A1* | 11/2015 | Bernaudin ....... G06Q 10/06398 |
| | | | 705/7.42 |
| 2016/0132901 | A1* | 5/2016 | Davar ............. G06F 16/24578 |
| | | | 705/7.29 |
| 2017/0061344 | A1 | 3/2017 | Han et al. |
| 2017/0068922 | A1 | 3/2017 | Singh et al. |
| 2017/0068976 | A1 | 3/2017 | Wawrzynowicz |
| 2017/0316438 | A1* | 11/2017 | Konig ................. G06Q 30/0201 |
| 2018/0012186 | A1 | 1/2018 | Baker et al. |
| 2018/0018684 | A1 | 1/2018 | Orr et al. |
| 2018/0144305 | A1 | 5/2018 | Kenthapadi |
| 2018/0268298 | A1 | 9/2018 | Johansen et al. |
| 2018/0300450 | A1* | 10/2018 | Hogan ................. G16B 20/10 |
| 2019/0066031 | A1 | 2/2019 | Hancock et al. |
| 2019/0188065 | A1* | 6/2019 | Anghel ............... G06F 11/0778 |
| 2019/0227822 | A1* | 7/2019 | Azmoon ............. H04L 41/5074 |
| 2019/0238396 | A1* | 8/2019 | Tedaldi .............. H04L 41/0636 |
| 2020/0160252 | A1 | 5/2020 | Sahni et al. |
| 2020/0265483 | A1* | 8/2020 | Tortoriello .......... H04M 3/5175 |
| 2020/0410427 | A1 | 12/2020 | Haze |
| 2021/0081972 | A1 | 3/2021 | Sahni et al. |
| 2022/0277242 | A1 | 9/2022 | Sahni et al. |

FOREIGN PATENT DOCUMENTS

| | | |
|---|---|---|
| JP | 2002-531900 | 9/2002 |
| JP | 2012/113542 | 6/2012 |
| JP | 2014-191377 | 10/2014 |
| JP | 2014/191539 | 10/2014 |
| JP | 2015-132950 | 7/2015 |

OTHER PUBLICATIONS

Z. Wang, V. Joo, C. Tong, X. Xin and H. C. Chin, "Anomaly Detection through Enhanced Sentiment Analysis on Social Media Data," 2014 IEEE 6th International Conference on Cloud Computing Technology and Science, Singapore, 2014, pp. 917-922, doi: 10.1109/CloudCom.2014.69. (Year: 2014).*

Andre et al., "Formal Model for Assigning Human Resources to Teams in Software Project," Information and Software Technology 53 (2011) 259-275. (Year: 2011).

Lise et al., "Multidimensional Skills, Sorting, and Human Capital Accumulation," University of Minnesota, 2016. (Year: 2016).

Rocabert et al., "Artificial Neural Network System Applied to Human Resource Management," Barcelona School of Industrial Engineering, Automatic Control Department, Sep. 2017. (Year: 2017).

* cited by examiner

282

| Support Cases | ▽ | ◉ | ◉ | ◉ | ◉ 00110190 | ◉ 00171764 | ⊙ Cash Receipt for... | ◉ 00162074 | ◉ 00179922 | ◉ |

Customer  
ABC Inc

Group asset 2120719PD012577 gave deprn error

The base case is 00110190. Group asset 2120719PD012577 gave errors in depreciation process, and could not be updated with member asset changes. We are going to try to recreate this group asset, as a solution for the problem.

Status  Customer Working  242
Priority  P3 – Standard Issue
Case Owner  Smith M
Lead Engineer  Kerr D

| Case | Account | Contact |
|---|---|---|

Contact Name
John K

Status
Customer Working

Case Owner
Smith M

Next Action:
Wait for a testing instance

Priority
P3 – Standard Issue

Follow The Sun Status
Follow the Sun

Product Line ⓘ  Products ⓘ
E-Business Suite (EBS)  Financials – FA

▼ Case Details

Product Line ⓘ  E-Business Suite (EBS)    Case Origin  Email
 Products ⓘ  Financials – FA    Support Program  Feature
 Module
 Subject  Group asset 2120719PD012577 gave deprn error
 Description  Group asset 2120719PD012577 gave errors in depreciation process, and could not be updated with member asset changes.
   We are going to try to recreate this group asset, as a solution for the problem. 243
 Solution ⓘ

▼ Case Escalations

Escalated  ☐
Escalation Owner ⓘ      Initial Escalation Date/Time      Escalation Status  Green ~ Low Risk
Escalation Creator ⓘ      Number of Escalations  0

C-Signal³
Modeling – Vectors List

| | Vector Name | Data Type | Anomaly Type | Escalation Impact (Case, Client, Both) | Description |
|---|---|---|---|---|---|
| 261 | Case Sentiments – General | Unstructured/NLP | Point Anomaly | Both | Measure negative-positive sentiments (NLP) |
| 262 | Case Sentiments – Urgency/Escalation | Unstructured/NLP | Point Anomaly | Both | Measure negative-positive sentiments (NLP) |
| 263 | Case Back-Forth, Number of updates from Client and RSI | Structure/Number Count | Contextual Anomaly | Both | Back and forth count between Rimini and Client on the case |
| 264 | Chasing (Repetitive Requests for Updates) | Unstructured/NLP | Contextual Anomaly | Both | Client chasing or Engineer chasing for an update |
| 265 | Case Life | Structure/Number of Days | Point Anomaly | Both | Number of days the case is opened |
| 266 | Case Average Update Time | Structure/Number of Days | Point or Contextual Anomaly | Both | Average time for update and response – meaningful response |
| 267 | Number of Documents Loaded | Structure/Number | Point Anomaly | Case | Total documents loaded in the case |
| 268 | Number of Owner changes* | Structure/Number | Point Anomaly | Case | Total number of Owner changes – Adoptive as we have FTS |
| 269 | Escalation History of the Client | Structure/Number | Contextual Anomaly | Both | Does this Client has previous history of Escalation |
| 270 | Client CSR Low-High | Structure/Number | Point Anomaly | Client | How is the CSR for negative and positive anomaly detection |
| 271 | Client Contact CSR Low-High | Structure/Number | Point Anomaly | Client | How is the CSR for negative and positive anomaly detection |
| 272 | Case Owner's & Lead Engineer CSR Low-High | Structure/Number | Point Anomaly | Case | Is Case Owner/Lead Engineer CSR low? |
| 273 | Case Priority | Structure/Number | Factor for Consideration | Case | Is Case Priority High? |

FIG. 2C

C-Signal3
Modeling – Vectors List – Continue

| | Vector Name | Data Type | Anomaly Type | Escalation Impact (Case, Client, Both) | Description |
|---|---|---|---|---|---|
| 274 | Renewal Time Approaching | Structured/Days Remaining | Factor for Consideration | Both | Clients tend to escalate the case when renewal time is approaching |
| 275 | T&R, FSS, ESS Utilization in Cases | Structured/Lead Engineer | Factor for Consideration | Both | Such cases usually have more time sensitivity involved (Ex compliance date) |
| 276 | Onboarding/New Client | Structured/Start of Service | Factor for Consideration | Both | Is this a New Client – also consider onboarding score |
| 277 | Increase in Case Volume from Client | Structured/Number | Collective Anomaly | Both | Client going live on a Country, deploying new products/features |
| 278 | Environment Access Issues | Structured/Number | Factor to Consideration | Both | Engineers are having issues to login to the client environment |

View Case Comments

| Product Line | Case Number | Case Owner Name | Client Name | Client Contact Name | Priority |
|---|---|---|---|---|---|
| SAP | 00176194 | Kate P | ABC Inc | Anthony S | P2 |

Vector Name/Case Value: Positive CSR Comments – appreciated
CSR Comment:
Kate is a star. She always responds and resolves our issues in quick time and is a true professional. Many thanks Kate. Much appreciated.
⊙ Comment Created By: Anthony S, ABC Inc    ⊙ Comment Created On: 2019-06-14 11:02:07

☐ Ignore all – False Positive    581

Vector Name/Case Value: Positive Case Comments – super
Case Comment:
Hi Wilma, super that you found the cause and provided the solution(s). Thank you very much for the quick and solid analysis. Pathfinder will decide on the way to solve this. You can lower the priority of the ticket rgPDieter
⊙ Comment Created By: Pete G, XYZ Company    ⊙ Comment Created On: 2019-01-10 14:00:22

☐ Ignore this – False Positive    582

C-Signal Insight  ⓢ₀ ⓘ₀₀ ②₀₀

| | We have errors on three rebates | Priority P3 – Standard Issue |
| --- | --- | --- |
| | We have errors on three rebates, a log file is attached. | Case Owner Raj P<br>Lead Engineer Jeff Y |

[ Feed ] [ Details ]

Case Comments [10+] | Case Team [2] | Case Milestones [10+] | Case Survey Responses [0] | Emails [0] | Open Activities [0] | Activity History

Support Case Detail

[ Edit ] [ Close Support Case ] [ Clone ] [ Create SubCase ]

▼ Case Overview

| | |
| --- | --- |
| Account Name | A-One Pharma Inc |
| Contact Name | Zeo Victor |
| Case Explicit Contact # | O |
| | P2 RS |
| Status | Customer Working |
| Complexity | A |
| Next Action: | check results with user |
| Confidential Case | O ☐ |
| Junk Case? | ☐ |
| Parent Case | |
| | Select System No |
| Follow the Sun Status | Follow the Sun |
| | Current System No |
| Client Support Start Time | 9:00 a.m. |
| Client Support End Time | 6:00 p.m. |
| | En |

| | 711 |
|---|---|
| 721 | Vector Name |
| 722 | Enable |
| 723 | Applicable to Object – Case |
| 724 | Applicable to Object – Contact |
| 725 | Applicable to Object – Client |
| 726 | Applicable to Polarity |
| 727 | Vector Type |
| 728 | Forced Low |
| 729 | Forced High |
| 730 | Weight |

FIG. 7

METHOD AND SYSTEM FOR PROACTIVE CLIENT RELATIONSHIP ANALYSIS

BACKGROUND

Outsourcing of non-core operations to third parties is a standard component of most modern business and organizational models. Consequently, many organizations utilize third party service providers to perform various functions and operations for the organization.

As a specific illustrative example, many organizations rely on multiple software systems in their day-to day operations. In many cases, these organizations use one or more Enterprise Application Software systems (EAS), also referred to as simply "enterprise software." EAS systems are designed to provide software capabilities to address the needs of the organization, or enterprise, as a whole rather than individuals within the organization. Therefore, EAS systems are typically highly complex systems. Given the complexity of these software systems, organizations often turn to software service providers to support the various software systems used by the organization. Typically, these organizations, or clients, of the software service providers are dependent on the supported software to generate revenue and manage expenses. Consequently, the services provided by the software service providers are often critical to their clients and the implementation, maintenance, and problem resolution services provided typically need to be performed very quickly and correctly.

In order to establish and maintain the trust of their clients, service providers typically utilize one or more client service systems or client relationship management systems to track and collect data about various jobs performed by the service provider. One specific example of a client service system is Salesforce™ The data collected by traditional client service systems allow an agent of the service provider, typically a human agent, to track job progress so that the agent can manage the relationship with the client efficiently and effectively.

Using traditional client service systems, a case is created based on a client job or issue. Each case is tracked, and data is collected, until the case is resolved or finished. As a case is tracked, various case performance data is typically generated throughout the lifetime of the case. Using traditional client service systems, the case performance data can then be analyzed to determine the performance of the service provider in handling the case for the client using various methods.

Traditional client service systems can be quite effective and are a powerful tool for tracking clients' jobs and maintaining client relationships. However, traditional client service systems are largely reactive systems that only alert an agent of the service provider to an issue once that issue has already occurred, or at least become a serious or escalated issue. For example, using traditional client service systems, only when a client reports a problem, or significant deviations in the data indicates a problem, is an agent alerted. In other cases, using traditional client service systems, managers typically only become aware of, and react to, the performance of agents in their charge when monitoring historical analytics of actions performed by agents. For example, a manager may study the average length of time it takes an agent to resolve a problem and react when the manager notices that an agent's average resolution time exceeds the average of other agents. In this example, the reaction of the manager may be providing such an agent additional training or transferring a case to a different agent if it is not resolved in a timely fashion. As another example, a manager may become aware of a dissatisfied client when that client submits a review of the service or the agent performing the service.

This type of reactive operation of traditional client service systems is a serious problem because using traditional client service systems an issue has typically already occurred, or at least escalated to the point of significant client dissatisfaction, before the service provider even becomes aware of the problem or the decline in the relationship with a client. Consequently, before the issue can be resolved, the trust and confidence of the client can be seriously damaged. Since as discussed above, in many cases, this trust and confidence is critical to the client/service provider relationship, the reactive nature of traditional client service systems often results in harm to the relationship. This, in turn, can often result in the client choosing a different service provider.

Consequently, while traditional client management systems can be effective to discover historical issues with client support performed by the service provider, the issues may have caused such severe harm to client relationships that the damage is irreversible and there is no time to correct the issues. Therefore, in these cases, the historical analysis with respect to the lost client becomes moot, at least with respect to that client.

Consequently, there is a significant need for a technical solution to the long-standing technical problem of providing client management systems the capability to identify or predict client issues early on and before they become significant problems; thereby allowing the service provider to proactively address the issues before the issues adversely affect the service provider/client relationship.

SUMMARY

Embodiments of the present disclosure provide a technical solution to the technical problem of providing more predictive and proactive client management systems.

In one embodiment, the disclosed technical solution includes collecting historical case data from one or more client service systems and using the historical case data to train one or more machine learning anomaly detection models to detect anomalies in the case data indicating potential client dissatisfaction. Once the one or more machine learning anomaly detection models are trained, current case data is provided to the trained one or more machine learning anomaly detection models and any anomalies in the current case data are identified. When one or more anomalies are detected in the case data for a specific case, that case, and the detected anomalies, are brought to the attention of a service provider agent or manager who can then act proactively to address or correct the anomaly before client dissatisfaction escalates.

In one embodiment, the disclosed technical solution includes collecting case data from client service systems, including unstructured conversational data representing communications between the client and the service provider. Machine learning methods, such as Natural Language Processing methods, are then used to identify client sentiments in communications between the client and the service provider. The sentiments detected can indicate client satisfaction or dissatisfaction with the handling of the case or the urgency of the need to intervene in the case. Once one or more sentiments are detected in the case data for a specific case, that case, and the detected sentiment are brought to the attention of a service provider agent or manager who can then act proactively to address the detected sentiment before client dissatisfaction escalates.

In one embodiment, the disclosed technical solution includes collecting historical case data from client service systems and using the historical case data to train one or more machine learning anomaly detection models to detect anomalies in the case data indicating potential client dissatisfaction. Once the one or more machine learning anomaly detection models are trained, current case data is provided to the trained one or more machine learning anomaly detection models and any anomalies in the current case data are identified. In addition, the current case data, including unstructured conversational data representing communications between the client and the service provider, is also processed using machine learning language processing methods to identify any client sentiments in conversational data.

Once the current case data is processed using the machine learning anomaly detection models and the machine learning language processing methods, any anomalies detected in the case data for a specific case, and/or any sentiments detected in the case data for the specific case, are collected in a report and provided as notifications, alerts, signals, user interface displays, and other report formats as discussed herein, or as known in the art at the time of filing, or as developed, or becomes available, after the time of filing. The detected anomalies and sentiments are brought to the attention of a service provider agent or manager who can then act proactively to address the detected anomalies and/or sentiments before client dissatisfaction escalates. It should be understood that anomalies and/or sentiments collected in a report can be collected ad hoc, as a compilation over a time period or at other intervals depending upon the application.

Using the disclosed embodiments, machine learning methods are used to monitor a client's level of satisfaction with support provided by a service provider in relative real time so that any needed corrective actions can be taken before the client's level of dissatisfaction rises to an unacceptable level, as may be defined by key performance indicators or other organizational metrics. Thus, the disclosed embodiments, represent a technical solution to the long-standing technical problem of providing client management systems that can identify or predict client issues before they escalate. Consequently, using the disclosed embodiments, the service provider can proactively address the issues before the issues adversely affect the service provider/client relationship.

BRIEF DESCRIPTION OF THE DRAWINGS

FIG. 2B shows an illustrative and non-exhaustive example user interface of case data used for proactive client relationship analysis.

FIGS. 2C and 2D together show an illustrative and non-exhaustive listing of vector data used for proactive client relationship analysis.

FIG. 5D shows an illustrative and non-exhaustive example user interface of sentiment report data identified based on sentiment signals and used for proactive client relationship analysis.

FIG. 6 shows an illustrative and non-exhaustive example user interface of signal report data used for proactive client relationship analysis.

FIG. 7 is an example table of vector controls for proactive client relationship analysis.

Figure 1:
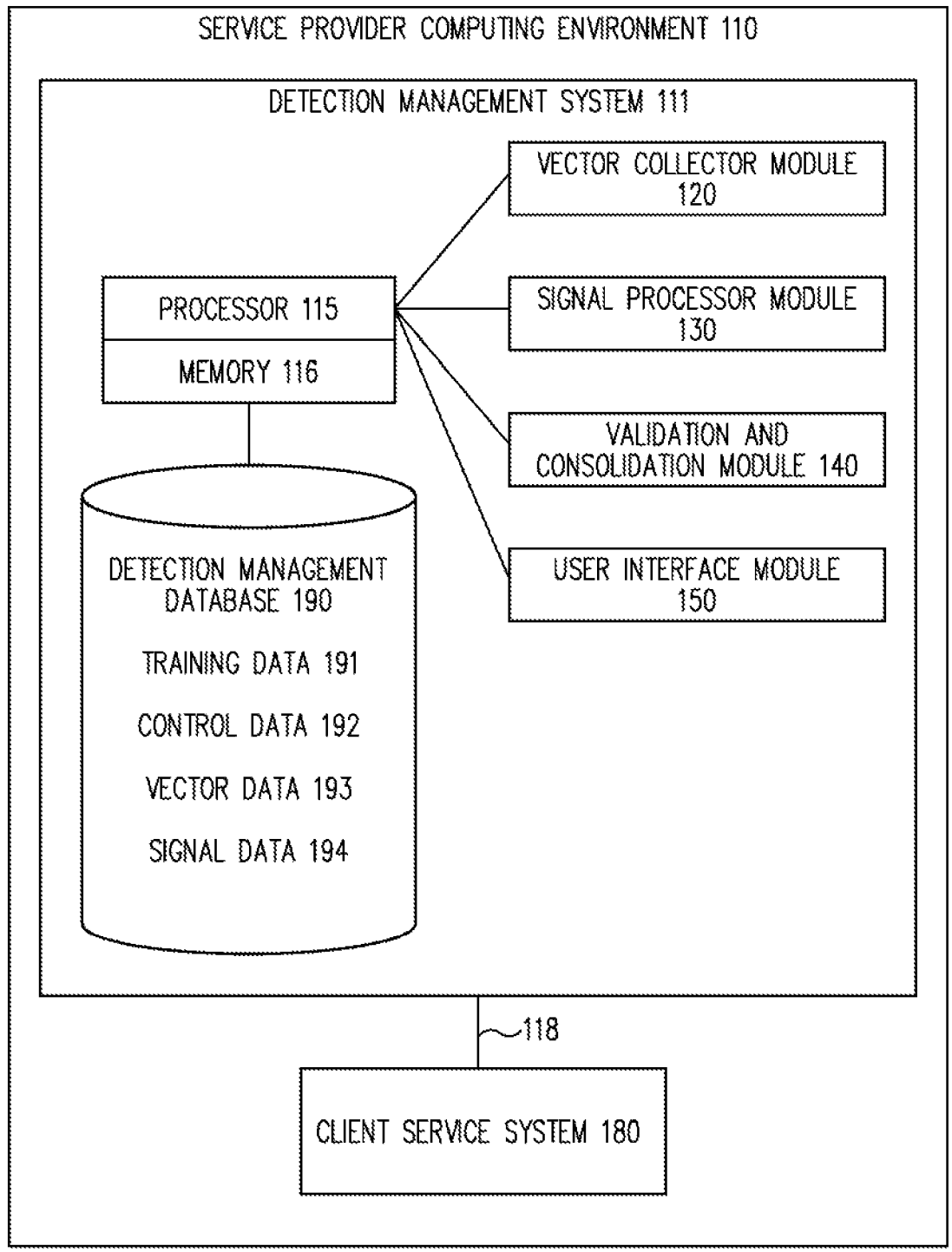
FIG. 1 is a high-level block diagram of an application environment for implementing a proactive client relationship analysis system.

Common reference numerals are used throughout the figures and the detailed description to indicate like elements. One skilled in the art will readily recognize that the above figures are examples and that other architectures, modes of operation, orders of operation, elements, and functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

As discussed in more detail below, embodiments of the present disclosure represent a technical solution to the technical problem of providing more predictive and proactive client management systems. To this end, the disclosed embodiments include proactive client signal detection by utilizing machine learning models to analyze vector data generated from client support system data to detect client signals. In one embodiment, the vector data represents a list of data fields upon which vector algebra operations can be performed. Vector data may be associated with inter-related objects such as, but not limited to, the cases, the clients associated with cases, and the contacts of the clients associated with cases, such as contact representative of the clients. It is to be understood that vector data may be associated with other objects as discussed herein, or as known in the art at the time of filing, or as developed, or becomes available, after the time of filing.

As discussed in more detail below, according to various embodiments, a client signal may be either a negative signal or a positive signal. It is to be understood that when proactive analysis is performed, it is not only beneficial to proactively detect negative signals that prevent harm to a client relationship, but also to proactively detect positive signals that enhance the client relationship. For example, a detected negative signal may indicate that attention is needed either by an agent or a manager. A detected positive signal may indicate that a best practice has been uncovered that can be shared with other agents and managers. It is to be understood that proactively detecting both negative signals and positive signals according to the disclosed embodiments allows managers to assess the overall condition of the service provider organization in order to continue to strategically grow the organization.

As discussed in more detail below, in various embodiments, a signal may be detected from anomalies within structured data. In one embodiment, an anomaly is a discovered result that is different from the expected result. In one embodiment, an anomaly can be a point anomaly, a trend anomaly, or other anomaly type as discussed herein, or as known in the art at the time of filing, or as developed, or becomes available, after the time of filing. According to the disclosed embodiments, a trend anomaly is discovered through analysis of historical data when the historical data is discovered to be changing along a trendline over time. For example, if a client logs on average thirty cases a week, and then in the current week, the client logs three hundred cases, then a trend anomaly can be detected based on the change in the trend of the data. According to the disclosed embodiments, a point anomaly is discovered through a single data point that deviates from the statistics, such as average, of other data points. For example, a client may provide a survey score of two of five, which may be a deviation from prior scores of four of five.

As discussed in more detail below, according to the disclosed embodiments, a signal may be detected from sentiments within unstructured data. In one embodiment, the unstructured data is conversation data representing communications between a client and an agent. For example, conversation data may represent text messages that are transmitted to and from a client and an agent. In this example, each text message may be a paragraph of writing, which represents unstructured data. Such unstructured data contains sentiments that are discovered based on a polarity score of plus one to minus one.

As discussed in more detail below, a positive polarity score indicates a positive sentiment. For example, a positive sentiment may be discovered from the word "happy" within the unstructured data. A negative polarity score indicates a negative sentiment. For example, a negative sentiment may be discovered from the phrase "very frustrated" within the unstructured data. According to the disclosed embodiments, words and phrases within unstructured data form a corpus. In one embodiment, a corpus is a body of text that can be analyzed within a natural language processing context, as is known in the art. In one embodiment, a sentiment may be an urgency sentiment, in which the unstructured data is determined to contain an indication that a case needs to be escalated to a more experienced agent, such as the phrase "critical to our production environment." Such a corpus is related to an urgency of a problem developing for a client that indicates that an escalation will be required in the future. Accordingly, cases can be classified based on the urgency of the defined corpus.

As discussed in more detail below, embodiments of the present disclosure proactively detect signals of case data associated with cases currently being serviced by a service provider. The service provider logs work done to solve the problems as case data within a client service system of the service provider. The case data is received by a detection management system of the service provider. Control data is generated that provides instructions for processing the received case data into vector data and for validating signal data generated from the vector data. The received case data is processed into vector data based on the instructions for processing of the control data that provides for analyzing the vector data by machine-learning based techniques.

As discussed in more detail below, in one embodiment, an anomaly signal processor module detects anomaly data within the vector data and a sentiment signal processor module detects sentiment data within the vector data. The anomaly data and the sentiment data are validated based on the control data that includes validation rules. The validated signal data is displayed to a user, such as a manager of the service provider, via a user interface.

For illustrative purpose, specific examples are provided herein where the client is a business or organization utilizing one or more Enterprise Application Software (EAS) systems, i.e., an enterprise software client, and the service provider is a software service provider tasked with implementing and maintaining EAS systems for the client. However, those of skill in the art will readily recognize that the disclosed embodiments can be utilized and employed with other types of client/service provider relationships. Therefore, the specific illustrative example of enterprise software client/software service provider relationship is not limiting to the scope of the invention as set forth in the claims.

In one embodiment, a client of the service provider is utilizing enterprise software to manage the client's business. In one embodiment, the client engages a service provider that is experienced with support of the enterprise software to solve the client's problems. Because the client is dependent on the enterprise software functioning correctly, the client has high expectations that the service provider will resolve the problem in a timely manner, which often is measured in days due to the complexity of the enterprise software. To assist the service provider in tracking all the issues of the clients for whom it provides services, the service provider typically utilizes a client service system to track all the cases of the clients. In a typical scenario, when the service provider is tasked with a job, or is alerted to an issue with a client's enterprise software, a case is logged in the client service system and one or more agents, typically human, of the service provider are assigned to the case for resolution.

When an agent works to complete a case, new data is added to the case data of the client service system. The case data may be structured in a format to populate a data field. This structured data has a defined length and format that is organizable and storable in a database, such as a relational database, by way of a non-limiting example. Such structured data can often be subject to computation analysis and, in particular, machine learning-based anomaly detection analysis, due to the consistent formatting of structured data.

As discussed in more detail below, structured data associated with a given case can include data representing various case information such as, but not limited to: the number of communications between the client and the service provider regarding the case; the lifetime of the case; the response time associated with the case; the number of documents, or other requests, made by the client in a given case; the number of updates requested by the client in a case; the average case update time; the number of times a service provider agent handling a given case has changed; the escalation history of the client associated with the case, i.e., how often a client has had cases escalated due to dissatisfaction; the low and high range of reviews submitted by the client associated with the case; the low and high range of reviews submitted by a specific contact of a client in a case; the low and high range of client reviews of service provider agents associated with the case; the priority of the case; the time to renewal of a service contract for a client associated with the case; the start of service for the client associated with the case; the strategic value and ability to reference the client associated with the case; and any other structured data associated with a case deemed to be potentially indicative of the client satisfaction with services provided by the service provider, as discussed herein, or as known in the art at the time of filing, or as developed, or becomes available, after the time of filing.

As discussed in more detail below, in addition to the structured data, information about a case may be unstructured in a format to populate a comment field. An example of unstructured data is any text-based conversation between a client and a service provider's agent. A typical client service system enables conversational interactions between clients and agents in the form of text, email, transcribed recording, etc. These conversation interactions generate unstructured conversational data. As discussed in more detail below, using the disclosed embodiments, this unstructured conversational data can be analyzed using one or more types of natural language processing (NLP) machine learning systems to detect the client sentiments and escalation urgency associated with a case.

As discussed in more detail below, according to the disclosed embodiments, the active or current case data of a client service system is analyzed using a detection management system. In one embodiment, the detection management system may include anomaly detection and/or NLP modules to determine if a client is receiving adequate service from the service provider. Accordingly, the client service system delivers case data to the detection management system of the service provider. In one embodiment, the detection management system processes and formats the case data into vector data through integration and aggregation to be analyzed by a machine learning model.

As discussed in more detail below, the detection management system may include an anomaly detector machine learning model for analyzing structured data for anomalies and a sentiment detector machine learning model for analyzing unstructured data for sentiments. An anomaly is associated with structured data that is unexpected in relation to other structured data. A sentiment is an expression in words that indicates that the service being provided by the service provider is either positive because it is generally helpful or negative because it is generally unhelpful.

The detection management system disclosed herein proactively determines whether a client is becoming happy or unhappy, early on, and before significant harm is done to the client/service provider relationship. This allows a manager, or other service provider agent, to take proactive action based on this determination.

Consequently, the detection management system disclosed herein proactively determines whether a client is becoming happy or unhappy, early on, and before significant harm is done to the client/service provider relationship. This allows a manager, or other service provider agent, to take proactive action based on this determination.

FIG. 1 is a high-level block diagram of an application environment 100 for proactive client relationship analysis. It is to be understood that the diagram of FIG. 1 is for exemplary purposes and is not meant to be limiting. In FIG. 1, the application environment 100 includes a service provider computing environment 110 that includes a detection management system 111. In one embodiment, the application environment 100 is a production environment. In other embodiments, the application environment 100 is a development environment, quality assurance environment, a combination of the foregoing environments, and any other environment as discussed herein, or as known in the art at the time of filing, or as developed, or becomes available, after the time of filing. The detection management system 111 includes a vector collector module 120, a signal processor module 130, a validation and consolidation module 140, and a user interface module 150.

In FIG. 1, the detection management system 111 includes a processor 115 and a memory 116. The memory 116 includes a detection management database 190 that stores data associated with services provided to customers. The detection management database 190 includes training data 191, control data 192, vector data 193, and signal data 194. The memory 116 includes instructions stored therein and which, when executed by the processor 115, performs a process for proactive client relationship analysis.

The application environment 100 includes instructions representing processes of the vector collector module 120, the signal processor module 130, the validation and consolidation module 140, and the user interface module 150, and other processes. As previously discussed, a training, testing or development environment may be utilized instead of a production environment to carry out certain embodiments of the invention, depending upon the desired detection of sentiments and anomalies used to determine signals for case, client and contact objects.

In one embodiment, the training data 191 includes historical case data from one or more client service systems. In one embodiment, the historical case data is used to train one or more machine learning anomaly detection models to detect anomalies in the case data indicating potential client dissatisfaction.

Any of the various known anomaly detection models, or any other known supervised models, can be utilized as machine learning-based anomaly detection models. As specific illustrative examples, the machine learning-based anomaly detection models can be one or more of Gaussian Distribution, Interquartile Range (IQR) or Support Vector Machine (SVM) machine learning-based anomaly detection models. In other cases, the machine learning-based anomaly detection models can be any anomaly detection models as discussed herein or known in the art at the time of filing, or as become known after the time of filing.

In one embodiment, the training data 191 includes corpus data utilized to train a machine learning-based natural language processing model. As discussed in more detail below, such corpus data includes data representing key words, phrases, or stems, used to detect positive and negative sentiments. As discussed below, in one embodiment, the user interface module 150 enables an agent or manager of the service provider to provide feedback to refine and retrain the machine learning models in a feedback loop to achieve more accurate results in anomaly and/or sentiment detection.

The machine learning models discussed herein may be trained utilizing supervised learning methodologies (e.g., classification and/or regression), unsupervised learning methodologies (e.g., clustering and/or association), semi-supervised learning methodologies (e.g., supervised and unsupervised), and other learning methodologies.

As discussed in more detail below with respect to FIG. 2A, the vector collector module 120 collects case data from one or more case data sources, such as a client service system 180. It is to be understood that although one client service system 180 is depicted in FIG. 1, there may be any number of client service systems 180 coupled to the detection management system 111 via one or more communication channels, such as communication channel 118. The client service system 180 includes case data about a case or job being handled by the service provider on behalf of the client, and the various interactions that the agents of a service provider have had with the client to resolve the problem.

As is known in the art, a client service system 180, sometimes known as a customer relationship management (CRM) system, is typically a software as a service (SAAS) offered in the cloud utilizing cloud computing technologies. Accordingly, case data can be available to all service provider users of the client service system 180. Therefore, coordinated escalation of cases within an organization of agents offering support services can be provided. Furthermore, case data is available to the detection management system 111 either in a processed format, such as summarized data, or in an unprocessed format, such as raw data.

As discussed in more detail below with respect to FIG. 3, the signal processor module 130 includes machine learning-based models or algorithms used to process the vector data collected by the vector collector module 120. In one embodiment, the models or algorithms of the signal processor module 130 are utilized to detect signal data such as anomaly data in the current case data. In one embodiment, if several anomalies are detected for an object such as a case, a contact, or a client, then the signal processor module 130 ranks and/or normalizes the anomalies.

As discussed in more detail below with respect to FIG. 3, in one embodiment, the models or algorithms of the signal processor module 130 include machine learning-based language/text processing models or algorithms. In one embodiment, the machine learning-based language/text processing models or algorithms are used to detect signal data, such as client sentiment data, in unstructured conversation data representing communications between the client and the service provider.

As discussed in more detail below with respect to FIG. 3, in one embodiment, the models or algorithms of the signal processor module 130 include both anomaly data machine learning-based language/text processing models or algorithms and machine learning-based language/text processing models or algorithms to detect both anomaly signal data and client sentiment signal data.

As discussed in more detail below with respect to FIG. 4, in one embodiment, the validation and consolidation module 140 validates and consolidates the detected anomaly and/or client sentiment signal data. In one embodiment, if an anomaly is determined by the signal processor module 130, the validation and consolidation module 140 validates that the detected anomaly is a true anomaly. For example, if a case is being managed on a twenty-four-hour basis, then the validation and consolidation module 140 would validate that it is proper for the case to be assigned to various agents as it is being worked around the clock, and that it has not been transferred between too many agents.

After the signal data 194 is handled by the validation and consolidation module 140, it is presented to a user via the user interface module 150.

As discussed in more detail below with respect to FIG. 5A through 5C, in one embodiment, the user interface module 150 provides various data and/or reports to agents and managers of the service provider including, but not limited to, data and/or reports indicating anomalies detected in the case data for specific cases and data and/or reports indicating any sentiments detected in the case data for specific cases. In addition, as discussed above, in one embodiment, the user interface module 150 enables an agent or manager of the service provider to provide feedback to refine and retrain the machine learning models in a feedback loop to achieve more accurate results in anomaly and sentiment detection.

As discussed in more detail below with respect to FIG. 5A through 5C, in one embodiment, the user interface module 150 includes a dashboard module 510 of signal information, a notification module 520 of signal information, and an indicator module 530 within the client service system 180 of signal information.

Figure 2A:
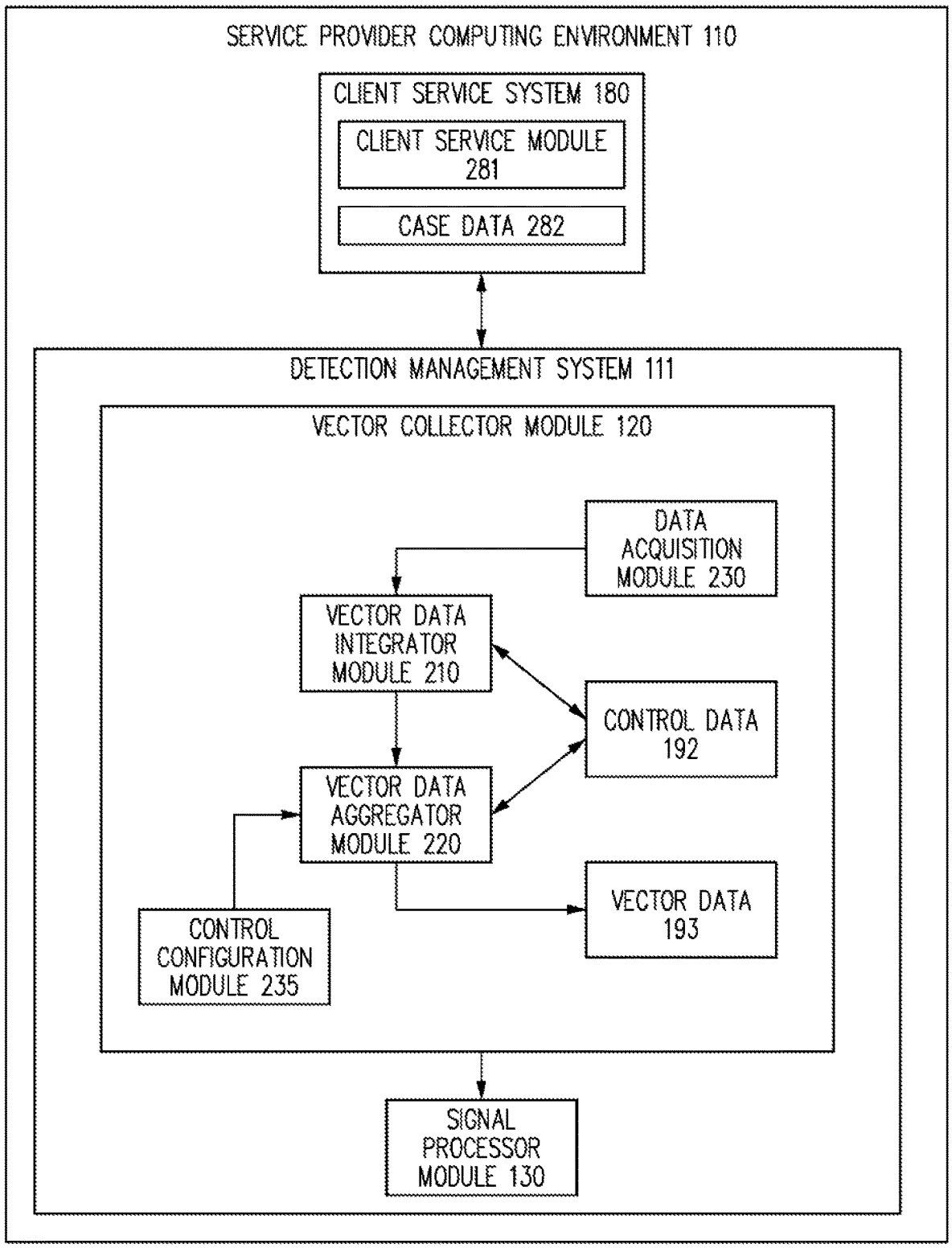
FIG. 2A is a block diagram of an application environment for proactive client relationship analysis including a more detailed block diagram of a client service system and vector collector module.

FIG. 2A shows the application environment 100 for proactive client relationship analysis, including a more detailed block diagram of client service system 180 and vector collector module 120 of detection management system 111. It is to be understood that the diagram of FIG. 2A is for exemplary purposes and is not meant to be limiting. Referring to FIGS. 1 and 2A together, the application environment 100 includes the service provider computing environment 110, which includes the client service system 180 and the detection management system 111.

The client service system 180 includes a client service module 281 that provides for the creation of case data 282. The case data 282 includes field data about the client, field data about the case, field data about customer surveys, text data about customer surveys, and conversation data representing conversations between the clients and the agents of the service provider. The case data 282 includes structured data and unstructured data. The structured data includes data fields that are used to categorize characteristics about a case. Structured data also includes information used to categorize characteristics about a client, such as a client that has provided positive references for the service provider in the marketplace, the breadth of the client's EAS system implementation across countries, regions, and modules and the contractual value associated with a particular client. The unstructured data includes textual comments associated with a case such as text conversations, customer survey comments, and other textual comments as discussed herein, or as known in the art at the time of filing, or as developed, or becomes available, after the time of filing.

FIG. 2B shows an illustrative and non-exhaustive example user interface 240 of case data 282 used for proactive client relationship analysis.

As seen in FIG. 2B, the user interface 240 depicts case data 282 including contact information 241, case information 242, and conversational information 243. Those of ordinary skill in the art will readily recognize that FIG. 2B is but a specific illustrative example of case data 282, and that numerous other types and arrangement of such data are possible and contemplated by the inventors. Consequently, the specific illustrative example of the type and arrangement of the case data 282 of FIG. 2B should not be read to limit the embodiments as set forth in the claims.

Returning to FIG. 2A, the case data 282 is received by the vector collector module 120. In one embodiment, the client service system 180 delivers the case data 282 in a raw format. In another embodiment, the client service system 180 delivers the case data 282 in a consolidated format. For example, the case data 282 in a consolidated format may be the average of a plurality of values of a structured field, such as the average for the past 6 months. For further example, the case data 282 in a consolidated format may be the number of documents associated with a case or the average of customer survey scores. In this example, the actual documents are not received by the detection management system 111. It is to be understood that case data 282 may be received from any system that includes information regarding a client.

The data acquisition module 230 of vector collector module 120 acquires the case data 282 from the client service system 180. The data acquisition module 230 uses the control data 192 that includes instructions for the receipt of the case data 282 in the desired format. Structured case data 282 may contain point anomalies of a single instance of a data point that is too far off from the rest of the data, contextual anomalies of data that is contextual typically in time-series data, collective anomalies that collectively demonstrate a problem such as a high number of cases logged by a client, and other anomalies that can be modeled as discussed herein, or as known in the art at the time of filing, or as developed, or becomes available, after the time of filing. For example, the case data 282 may, in various circumstances, be received as raw data, as analyzed data, as computed data, and as other forms of data as discussed herein, or as known in the art at the time of filing, or as developed, or becomes available, after the time of filing. It is to be understood that the format of the received case data 282 is determined based on the desired signal. In one embodiment, the case data 282 is selected from or received as raw data from the client service system 180 and may be utilized as historical case vector data and current case vector data, respectively.

The vector collector module 120 also includes a vector data integrator module 210 that integrates the collected case data 282 and includes a vector data aggregator module 220 that analyzes the integrated collected case data 282 for use as vector data 193. The vector collector module 120 also includes a control configuration module 235 that provides for the modification of control data 192 for machine learning model training, as described further below. It is to be understood that although the control configuration module 235 is depicted in the vector collector module 120, it may also be included in the signal processor module 130 and/or the validation and consolidation module 140.

The vector data integrator module 210 receives the formatted case data 282 via the data acquisition module 230. The vector data integrator module 210 integrates the case data 282 into an integrated format. Examples of integrations performed using hypertext preprocessor (PHP) scripts by the vector data integrator module 210 are case history data integration, case owner change data integration, case attachment data integration, case comments count data integration, case comment data integration, case status history data integration, case last three consecutive customer survey report data, and other integrations as discussed herein, or as known in the art at the time of filing, or as developed, or becomes available, after the time of filing. Such integrations may be performed every hour, every day, and other scheduled time as desired, or discussed herein, or as known in the art at the time of filing, or as developed, or becomes available, after the time of filing.

The vector data aggregator module 220 receives the integrated case data 282 from the vector data integrator module 210 and aggregates the integrated case data 282 to generate vector data 193. Examples of aggregations performed using procedures, such as by way of non-limiting examples, SQL procedures and other query language procedures, performed by the vector data aggregator module 220 is a vectors aggregation process and other aggregations as discussed herein, or as known in the art at the time of filing, or as developed, or becomes available, after the time of filing. Such aggregations may be performed every hour, every day, and other scheduled times as discussed herein, or as known in the art at the time of filing, or as developed, or becomes available, after the time of filing. It is to be understood that vector data 193 can be generated from only the vector data integrator module 210, from only the vector data aggregator module 220, and from both the vector data integrator module 210 and the vector data aggregator module 220.

FIGS. 2C and 2D together show a specific illustrative and non-exhaustive listing 250 of vector data 193 used for proactive client relationship analysis.

As seen in FIGS. 2C and 2D, the listing 250 of vector data 193 includes vector name 251, data type 252, anomaly type 253, escalation impact 254, and description 255.

The vector 261 has a vector name 251 of "Case Sentiments—General," a data type 252 of "Unstructured/NLP," an anomaly type 253 of "Point Anomaly," an escalation impact 254 of "Both," and a description 255 of "Measure negative-positive sentiments (NLP)."

The vector 262 has a vector name 251 of "Case Sentiments—Urgency/Escalation," a data type 252 of "Unstructured/NLP," an anomaly type 253 of "Point Anomaly," an escalation impact 254 of "Both," and a description 255 of "Measure negative-positive sentiments (NLP)."

The vector 263 has a vector name 251 of "Case Back-Forth, Number of updates from Client and Agent," a data type 252 of "Structure/Number Count," an anomaly type 253 of "Contextual Anomaly," an escalation impact 254 of "Both," and a description 255 of "Back and forth count between Agent and Client on the case." The vector 263 represents a count of the number of communications being conducted back and forth between a client and the agents assigned to the client's case. For example, with a complex support case for an enterprise client, a typical back and forth count may be fifty. In this example, if a case has a back and forth count of one hundred and seventy-five times, then the anomaly signal processor module (discussed below) may proactively determine that there is an anomaly that has been signaled that a manager can address.

The vector 264 has a vector name 251 of "Chasing (Repetitive Requests for Updates)," a data type 252 of "Unstructured/NLP," an anomaly type 253 of "Contextual Anomaly," an escalation impact 254 of "Both," and a description 255 of "Client chasing or Engineer chasing for an update."

The vector 265 has a vector name 251 of "Case Life," a data type 252 of "Structure/Number of Days," an anomaly type 253 of "Point Anomaly," an escalation impact 254 of "Both," and a description 255 of "Number of days the case is opened."

The vector 266 has a vector name 251 of "Case Average Update Time," a data type 252 of "Structure/Number of Days," an anomaly type 253 of "Point or Contextual Anomaly," an escalation impact 254 of "Both," and a description 255 of "Average time for update and response—meaningful response."

The vector 267 has a vector name 251 of "Number of Documents Loaded," a data type 252 of "Structure/Number," an anomaly type 253 of "Point Anomaly," an escalation impact 254 of "Case," and a description 255 of "Total documents loaded in the case." The vector 267 represents the number of documents that have been uploaded for a case. For example, a typical case for an enterprise client involves the upload of less than ten documents, and if fifty documents are uploaded, then the anomaly signal processor module (discussed below) may proactively determine that there is an anomaly that has been signaled that a manager can address.

The vector 268 has a vector name 251 of "Number of Owner changes," a data type 252 of "Structure/Number," an anomaly type 253 of "Point Anomaly," an escalation impact 254 of "Case," and a description 255 of "Total number of Owner changes—Adaptive as we have FTS (Follow The Sun)." The vector 268 represents a count of times there has been a change of an agent being responsible for a case. Typically with an enterprise case, the count of case owner changes in the past three months may be three changes, and if there is a count of ten changes, then the anomaly signal processor module (discussed below) may proactively determine that there is an anomaly that has been signaled that a manager can address.

The vector 269 has a vector name 251 of "Escalation History of the Client," a data type 252 of "Structure/Number," an anomaly type 253 of "Contextual Anomaly," an escalation impact 254 of "Both," and a description 255 of "Does this Client have previous history of Escalation."

The vector 270 has a vector name 251 of "Client CSR Low-High," a data type 252 of "Structure/Number," an anomaly type 253 of "Point Anomaly," an escalation impact 254 of "Client," and a description 255 of "How is the Customer Survey Result for negative and positive anomaly detection."

The vector 271 has a vector name 251 of "Client Contact CSR Low-High," a data type 252 of "Structure/Number," an anomaly type 253 of "Point Anomaly," an escalation impact 254 of "Client," and a description 255 of "How is the Customer Survey Result for negative and positive anomaly detection."

The vector 272 has a vector name 251 of "Case Owner's & Lead Engineer CSR Low-High," a data type 252 of "Structure/Number," an anomaly type 253 of "Point Anomaly," an escalation impact 254 of "Case," and a description 255 of "Is Case Owner/Lead Engineer Customer Survey Result low?"

The vector 273 has a vector name 251 of "Case Priority," a data type 252 of "Structure/Number," an anomaly type 253 of "Factor for Consideration," an escalation impact 254 of "Case," and a description 255 of "Is Case Priority High?"

The vector 274 has a vector name 251 of "Renewal Time Approaching," a data type 252 of "Structured/Days Remaining," an anomaly type 253 of "Factor for Consideration," an escalation impact 254 of "Both," and a description 255 of "Clients tend to escalate the case when renewal time is approaching."

The vector 275 has a vector name 251 of "T&R, FSS TSS Utilization in Cases," a data type 252 of "Structured/Lead Engineer," an anomaly type 253 of "Factor for Consideration," an escalation impact 254 of "Both," and a description 255 of "Such cases usually have more time sensitivity involved (Example compliance date)." By way of non-limiting examples, such cases may involve tax, legal and regulatory updates that require timely action to account for changes in applicable laws or regulations so that the proper output documents can be generated from the EAS system. An update may include a tax update that is a change to the sales tax rate of a municipality from a first year to a second year or another relevant time period.

The vector 276 has a vector name 251 of "Onboarding/New Client," a data type 252 of "Structured/Start of Service," an anomaly type 253 of "Factor for Consideration," an escalation impact 254 of "Both," and a description 255 of "Is this a New Client—also considering onboarding score."

The vector 277 has a vector name 251 of "Increase in Case Volume from Client," a data type 252 of "Structured/Number," an anomaly type 253 of "Collective Anomaly," an escalation impact 254 of "Both," and a description 255 of "Client going live on a Country, deploying new products/features."

The vector 278 has a vector name 251 of "Environment Access Issues," a data type 252 of "Structured/Number," an anomaly type 253 of "Factor for Consideration," an escalation impact 254 of "Both," and a description 255 of "Engineers are having issues to login to the client environment."

Other examples of a vector 278 utilized by the anomaly signal processor module include vectors that characterize client data such as a strategic or contractual value associated with a client at a particular stage of the relationship and the history of the client as having provided positive external references for the service provider. The client-related vector may have a data type 252 of "Structure/Strategic Client" or "Structure/Referenceable Client." The client-related vectors may have an anomaly type of "Factor for Consideration" and escalation impact of "Client" although the case-related and contact-related vectors may impact the case as well.

Those of ordinary skill in the art will readily recognize that FIGS. 2C and 2D are but a specific illustrative example of vector data 193, and that numerous other types and arrangement of such data are possible and contemplated by the inventors. Consequently, the specific illustrative example of the type and arrangement of the vector data 193 of FIGS. 2C and 2D should not be read to limit the embodiments as set forth in the claims.

Figure 3:
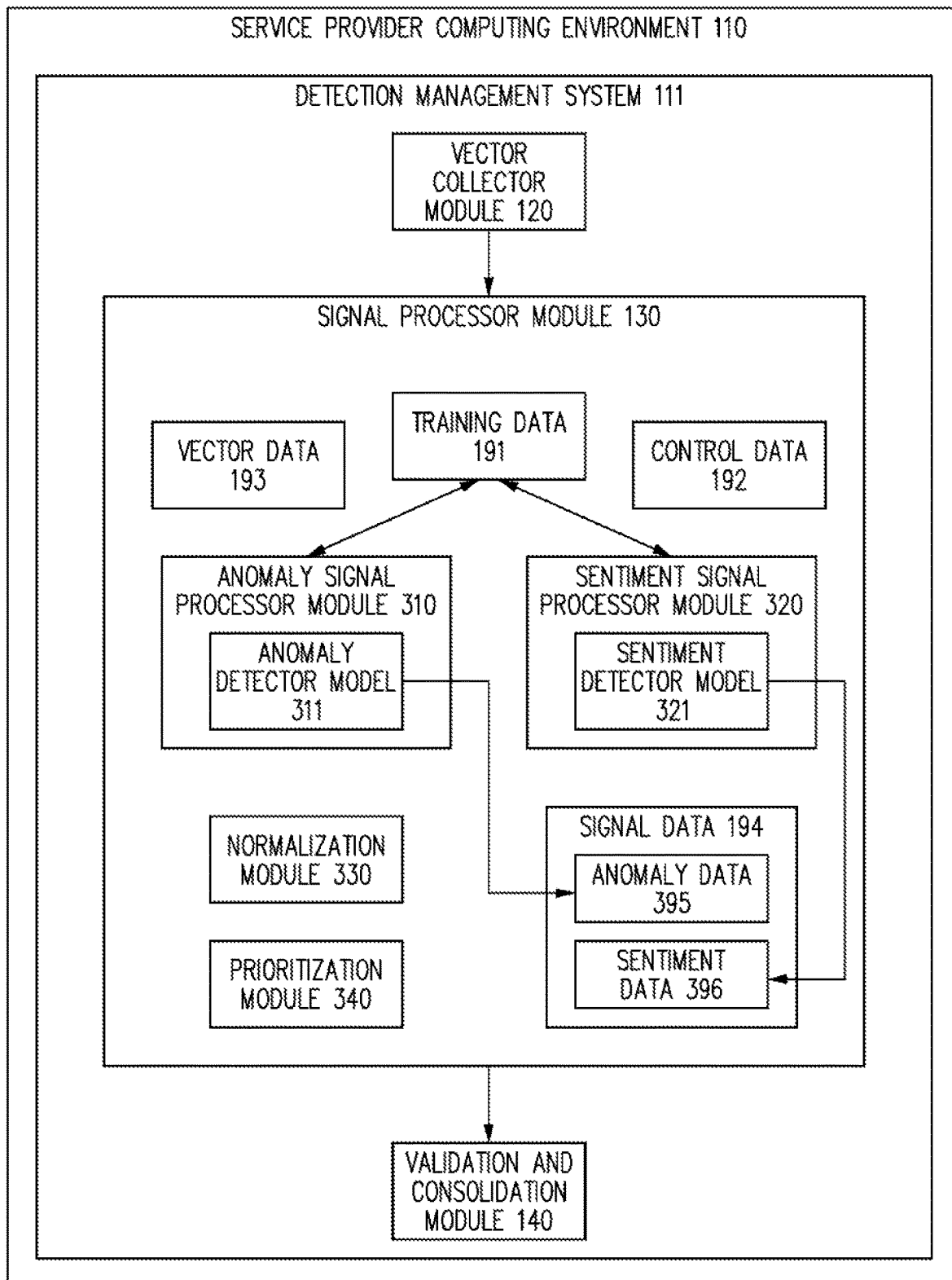
FIG. 3 is a block diagram of an application environment for proactive client relationship analysis including a more detailed block diagram of a signal processor module.

FIG. 3 shows the application environment 100 for proactive client relationship analysis, including a more detailed block diagram of signal processor module 130. It is to be understood that the diagram of FIG. 3 is for exemplary purposes and is not meant to be limiting. Referring to FIGS. 1, 2A, and 3 together, the application environment 100 includes the service provider computing environment 110, which includes the detection management system 111. The detection management system 111 includes the vector collector module 120, the signal processor module 130, and the validation and consolidation module 140. The signal processor module 130 receives the vector data 193 from the vector collector module 120. In various embodiments, the signal processor module 130 can include only an anomaly signal processor module 310. In various embodiments, the signal processor module 130 can include only a sentiment signal processor module 320. In various embodiments, signal processor module 130 can include both an anomaly signal processor module 310 and a sentiment signal processor module 320. As seen in FIG. 3, signal processor module 130 also includes a normalization module 330, and a prioritization module 340.

The anomaly signal processor module 310 processes the vector data 193 to detect anomaly data 395 of the signal data 194. The sentiment signal processor module 320 processes the vector data 193 to detect sentiment data 396. It is to be understood that the signal data 194 includes anomaly data 395 detected by the anomaly signal processor module 310 and/or sentiment data 396 detected by the sentiment signal processor module 320.

The anomaly signal processor module 310 detects anomalies within the structured data of the vector data 193 with an anomaly detector model 311, which is a machine learning model. In one embodiment, the anomaly detector model 311 utilizes the TensorFlow platform and other machine learning platforms as discussed herein, or as known in the art at the time of filing, or as developed, or becomes available, after the time of filing. A machine learning platform provides various statistical methods for anomaly detection. In one embodiment, a machine learning model is trained with the execution of an anomaly detection and consolidation process Python programming language script and other scripts as discussed herein, developed in other programming languages, or as known in the art at the time of filing, or as developed, or becomes available, after the time of filing.

In one embodiment, the anomaly detector model 311 is trained using training data 191 with supervised learning. As noted, training data 191 can include data related to any of the vectors listed in FIGS. 2C and 2D, or any vectors desired, discussed herein, known in the art, or as become known. Returning to FIG. 3, the anomaly detector model 311 utilizes machine learning algorithms which are trained based on a determination of a trend. For example, a vector of case life is based on structured vector data 193, in which the vector represents the days that a case has been open. In this example, if a case life is more than sixty-three days, then that is determined to be an anomaly and if a case life is less than half a day, then that is also determined to be an anomaly. In this example, thresholds are determined of a minimum threshold and a maximum threshold. In this example, the anomaly detector model 311 is trained by a data scientist based on such thresholds that override the machine learning algorithm.

In one embodiment, the anomaly signal processor module 310 utilizes IQR to determine anomalies that are outliers, as is known in the art. For example, under IQR, an outlier is a data value that is much smaller or much larger than the other values in the data set. In one embodiment, the anomaly signal processor module 310 utilizes a Gaussian distribution algorithm, as is known in the art. For example, with a Gaussian distribution algorithm, anomalies are detected by testing a data value against other data values that are distributed with a mean Mu and a variance Sigma squared. It is to be understood that other data anomaly detection methods may be utilized such as K-Nearest Neighbor (KNN), K-Mean based clustering, Support Vector Machine (SVM), and other anomaly detection methods and machine learning algorithms to find the most positive and negative anomalies and signals for potential consolidation, as discussed herein, or as known in the art at the time of filing, or as developed, or becomes available, after the time of filing.

The sentiment signal processor module 320 detects sentiments within the unstructured data of the vector data 193 with a sentiment detector model 321, which is a machine learning model. In one embodiment, the sentiment detector model 321 utilizes the Natural Language Toolkit (NLTK) platform and other natural language platforms as discussed herein, or as known in the art at the time of filing, or as developed, or becomes available, after the time of filing. In one embodiment, a natural language module is trained with the execution of a sentiment detection and consolidation process python script and other scripts as discussed herein, or as known in the art at the time of filing, or as developed, or becomes available, after the time of filing.

The sentiment detector model 321 is trained using training data 191 with supervised learning. The training data 191 is generated from information collected from managers about previously determined sentiments. In one embodiment, the manager reviews a determined sentiment in the form of a corpus, which is a word or phrase. For example, a corpus may be "unhappy" that the sentiment detector model 321 had determined is a negative signal. However, when the manager reviews the comment within which the corpus "unhappy" is used, the manager sees that the term "unhappy" is directed to something other than a service provided by the service provider, such as unhappiness about what a contact had for lunch. In this example, the manager associates this corpus with a false positive indication. The user interface module 150 enables the manager of the service provider to provide this type of feedback to refine and retrain the machine learning models in a feedback loop to achieve more accurate results in anomaly and/or sentiment detection. After the corpus is associated with a false positive indication, a data scientist or agent adds to the training data 191 that the corpus "unhappy" and "lunch" when found together are not negative signals and are to be ignored. After the sentiment detector model 321 is trained with this new training data 191, the sentiment detector model 321 will not determine that such corpus of "unhappy" and "lunch" are negative signals. It should be understood that the agent can be a subject matter expert or programmed job or a machine learning model previously described to act on the false positives and continue to improve the training data and the subsequent outcome of anomaly and sentiment signal detection.

The user interface module 150 enables the manager of the service provider to provide this type of feedback to refine and retrain the machine learning models in a feedback loop to achieve more accurate results in anomaly and/or sentiment detection. After the corpus is associated with a false positive indication, false positive data is generated indicating that the corpus "unhappy" and "lunch" when found together are not negative signals and are to be ignored. This false positive data is then added to the training data 191 by human and/or non-human agents such as, but not limited to, data scientists, programmers, bots, runtime and/or offline machine learning training modules and systems, and/or any other agents capable of providing updates and modifications to machine learning based systems and/or databases. After the sentiment detector model 321 is trained with this new training data 191, the sentiment detector model 321 will not determine that such corpus of "unhappy" and "lunch" are negative signals going forward.

In one embodiment, the sentiment signal processor module 320 utilizes sentiments analysis in which the sentiments are ranked negatively and positively based on a polarity scale of minus one to positive one, as is known in the art. For example, the word "disaster" might be assigned −1.0 while the word "unhappy" might be assigned −0.7. The sentiment signal processor module 320 utilizes tokenization in which sentence and words are tokenized with a lexicon analyzer, as is known in the art. The sentiment signal processor module 320 utilizes text classification in which named entities such as places, people and organizations are recognized as a noun, as is known in the art. For example, the word "joy" is both a sentiment word and is a first name of a person. The sentiment signal processor module 320 utilizes stemming and lemmatization in which different versions of words are consolidated, such as consolidating "frustrated" and "frustrating" to "frustrate," as is known in the art. The sentiment signal processor module 320 utilizes speech tagging in which the context of the speech is determined, as is known in the art. The sentiment signal processor module 320 utilizes stop word removal in which unimportant words are removed, as is known in the art.

A sentiment may be categorized as either a general sentiment or a friction sentiment. A general sentiment is an indication that a client is either expressing a negative sentiment within conversational text or expressing a positive sentiment within conversational text. A friction sentiment is an indication that there is an issue with the resolution of a case that a manager should be made aware of, in that the friction sentiment indicates that escalation of the case is imminent.

The normalization module 330 is utilized when a plurality of anomalies is detected for an object, such as a case, a contact, or a client. For example, if five different anomalies are detected, the normalization module 330 performs normalization computation on the plurality of anomalies. The control data 192 includes normalization rules that provide instructions for the normalization computation. For example, a normalization rule may be to sum the number of detected anomalies based on a weight determined by the prioritization module 340. For further example, a normalization may include a range having minimum and maximum thresholds, such as a minimum of one day to resolve a case and a maximum of ninety days to resolve a case, and a normalization algorithm can determine a normalized value based on a minimum and maximum scale. Such a normalized value can be determined based on a Euclidean distance algorithm and other normalization algorithms as discussed herein, or as known in the art at the time of filing, or as developed, or becomes available, after the time of filing.

The prioritization module 340 is utilized to determine the prioritization of a particular vector that is determined to be an anomaly. The prioritization module 340 utilizes a weighting to determine the priority of a particular vector. The control data 192 includes weighting rules that provide instructions for the prioritization weighting by the prioritization module 340. For example, for each vector, a weight is assigned from zero to one, in which zero is a minimum weight and one is a maximum weight. In this example, a weight may be assigned that falls between zero and one, such as a weight of 0.65. In this example, if eight anomalies are detected for eight different vectors, and each vector has a weight of one, then eight anomalies are detected. However, if four of the eight vectors have a weight of 0.75 and the other four of the eight vectors has a weight of 0.25, then four anomalies are determined to be detected based on a weighting calculation for prioritization. It is to be understood that other calculations of prioritization may be utilized as discussed herein, or as known in the art at the time of filing, or as developed, or becomes available, after the time of filing.

Figure 4:
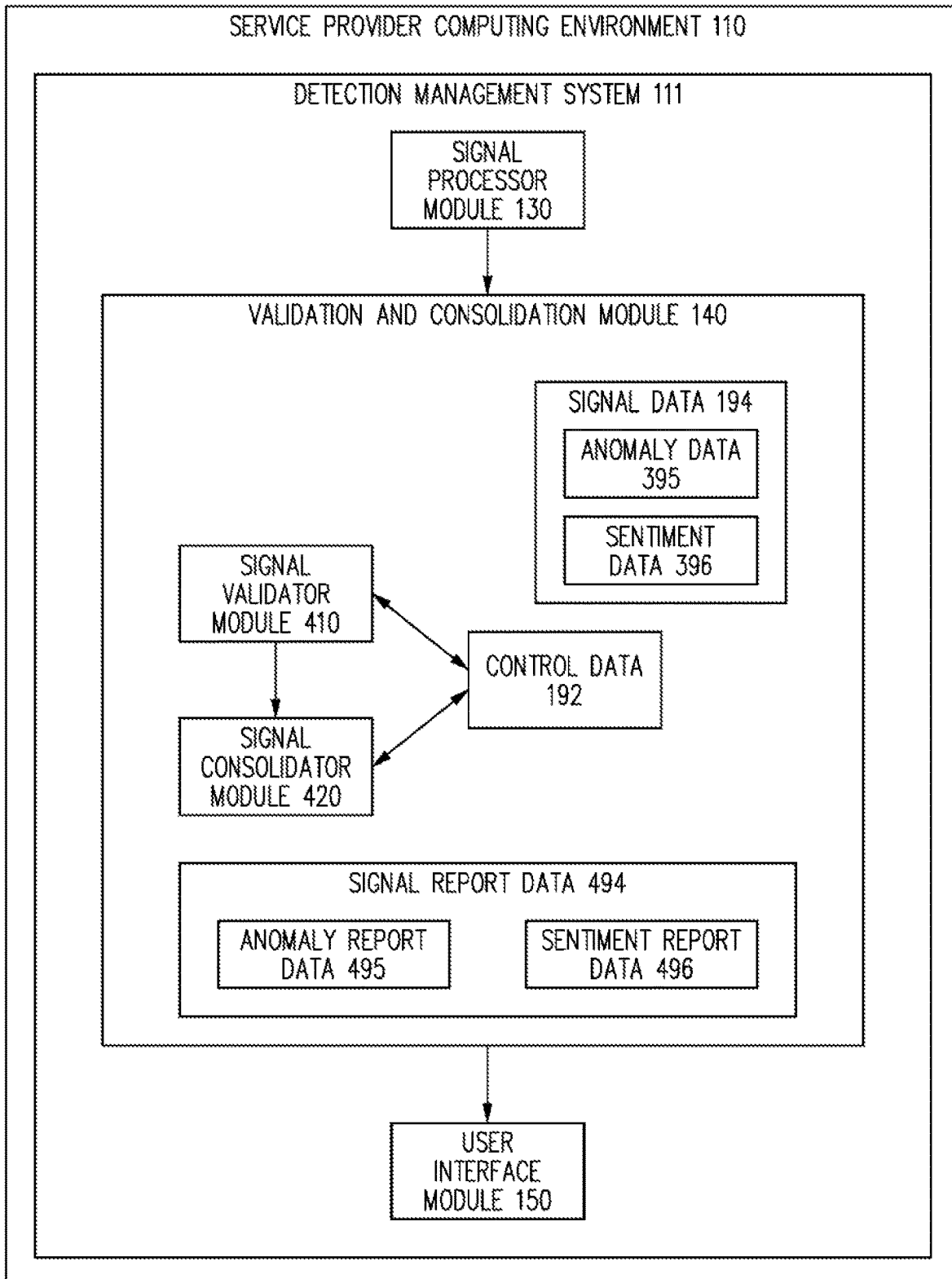
FIG. 4 is a block diagram of an application environment for proactive client relationship analysis including a more detailed block diagram of a validation and consolidation module.

FIG. 4. shows the application environment 100 for proactive client relationship analysis, including a more detailed block diagram of validation and consolidation module 140. It is to be understood that the diagram of FIG. 4 is for exemplary purposes and is not meant to be limiting. Referring to FIGS. 1, 2A, 3, and 4 together, the application environment 100 includes the service provider computing environment 110, which includes the detection management system 111. The detection management system 111 includes the signal processor module 130, the validation and consolidation module 140, and the user interface module 150. The validation and consolidation module 140 receives from the signal processor module 130 the signal data 194, which includes the anomaly data 395 and/or the sentiment data 396. The validation and consolidation module 140 includes a signal validator module 410 and a signal consolidator module 420.

The signal data 194 is generated from the detected anomalies and/or the detected sentiments. The signal validator module 410 validates that the generated signals are valid based on the control data 192. The signal validator module 410 prevents a detected signal from being added to the signal data 194 when the detected signal is being influenced by factors unrelated to the anomaly, such as anomalous noise. For example, if a vector is "case owner change," and an anomaly is detected for too many changes to the case owner, a rule in the control data 192 may instruct that when support is being offered on a twenty-four-hour basis, then it is not an anomaly if there are frequent case owner changes as different agents are assigned to own the case. In this example, although the count of changes of a case owner may be high, the signal validator module 410 determines that such is not an anomaly for cases being worked on for a twenty-four-hour basis.

In some embodiments, the signal consolidator module 420 consolidates a plurality of detected signals that are associated with an object such as a case, a contact, and a client. For example, where signal processor module includes both anomaly signal processor module 310 and sentiment signal processor module 320 so that both anomaly and sentiment signals are detected, if there are five anomalies and/or five sentiments detected, then the five anomalies and/or five sentiments are consolidated together before being added to the signal data 194.

After the signal data 194 is validated by the signal validator module 410 and the signal data 194 is consolidated by the signal consolidator module 420, the validation and consolidation module 140 generates signal report data 494. It is to be understood that the signal report data 494 includes anomaly report data 495 and sentiment report data 496. Signal report data 494 is then sent to user interface module 150.

Figure 5A:
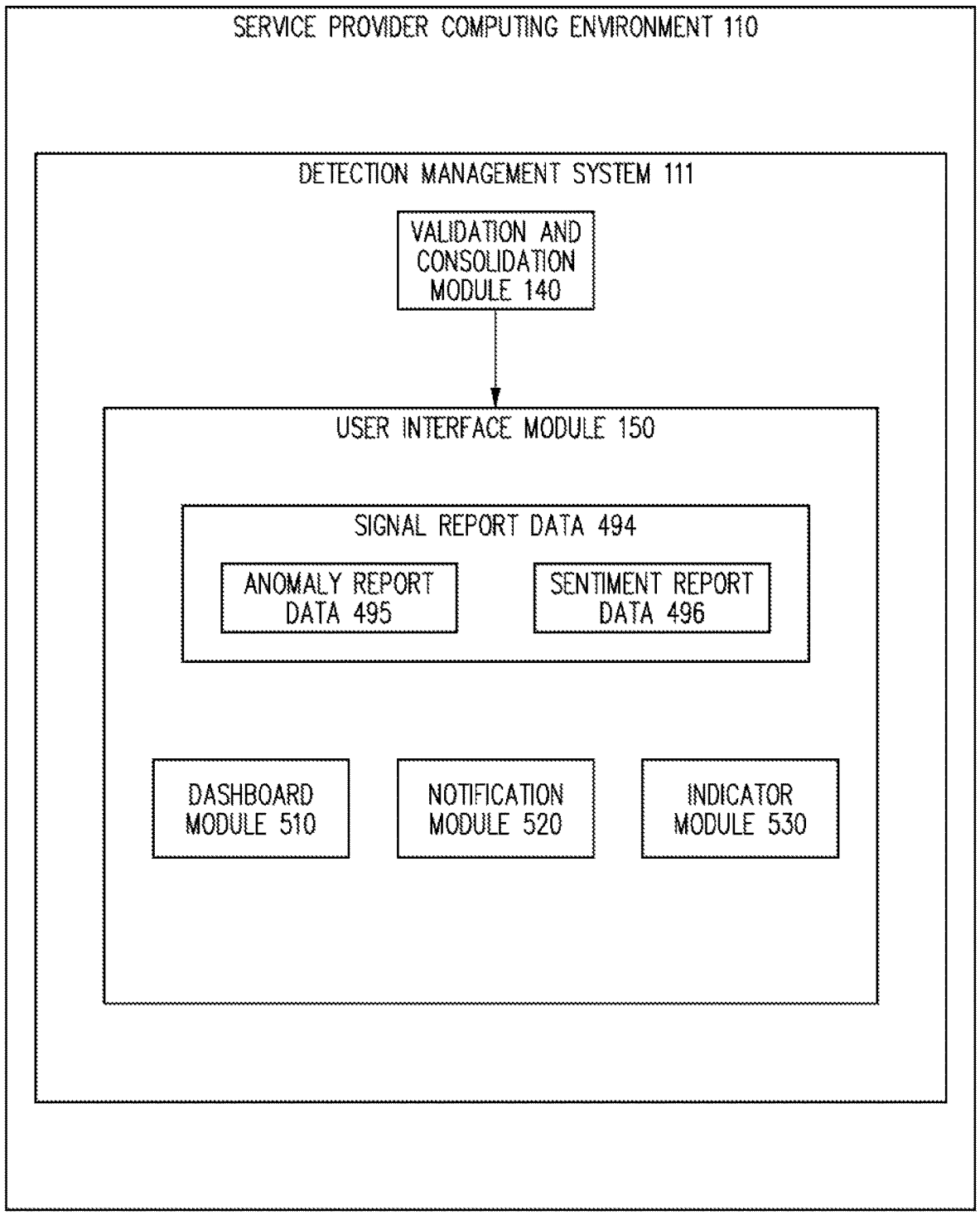
FIG. 5A is a block diagram of an application environment for proactive client relationship analysis including a more detailed block diagram of a user interface module.

FIG. 5A shows the application environment 100 for proactive client relationship analysis, including a more detailed block diagram of user interface module 150. It is to be understood that the diagram of FIG. 5A is for exemplary purposes and is not meant to be limiting. Referring to FIGS. 1, 2A, 3, 4, and 5A together, the application environment 100 includes the service provider computing environment 110, which includes the detection management system 111. The detection management system 111 includes the validation and consolidation module 140 and the user interface module 150. The user interface module 150 receives the signal report data 494 from the validation and consolidation module 140. The user interface module 150 includes a dashboard module 510, a notification module 520, and an indicator module 530.

The dashboard module 510 displays the signal report data 494 and includes a listing of signals of anomalies and a listing of signals of sentiments. The listing of signals of anomalies provides a count of cases having a number of detected anomalies. The listing of signals of sentiments provides a count of cases having a number of detected sentiments. In one embodiment, the dashboard module 510 displays the listing of signals of anomalies separately from the listing of signals of sentiments.

Figure 5B:
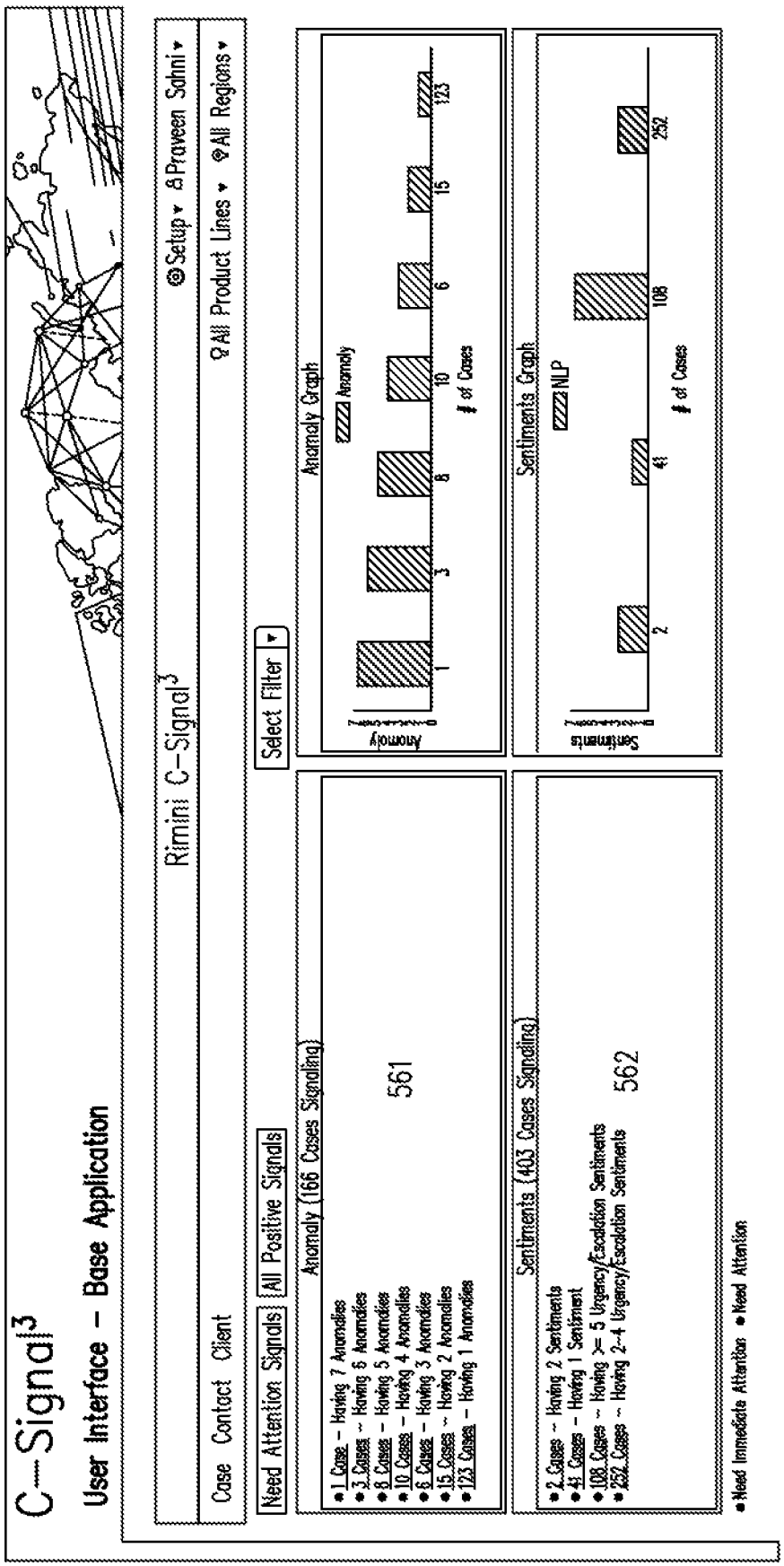
FIG. 5B shows an illustrative example of a signal report generated by the user interface module of FIG. 5A.

FIG. 5B shows an illustrative example of a signal report 560 generated by the user interface module of FIG. 5A.

As seen in FIG. 5B, the signal report 560 depicts negative signals including anomaly information 561 and sentiment information 562. The anomaly information 561 depicts that there is 1 case having 7 anomalies, 3 cases having 6 anomalies, 8 cases having 5 anomalies, 10 cases having 4 anomalies, 6 cases having 3 anomalies, 15 cases having 2 anomalies, and 123 cases having 1 anomaly. The sentiment information 562 depicts that there are 2 cases having 2 general sentiments, 41 cases having 1 general sentiment, 108 cases having 5 urgency sentiments or greater, and 252 cases having 2 to 4 urgency sentiments.

Those of ordinary skill in the art will readily recognize that FIG. 5B is but a specific illustrative example of a signal report 560, and that numerous other types and arrangement of such reports are possible and contemplated by the inventors. For instance, a specific illustrative example of a signal report 560 includes both anomaly information 561 and sentiment information 562 indicating that, in this specific illustrative example, signal processor module includes both anomaly signal processor module 310 and sentiment signal processor module 320. However, as noted above, some embodiments include only anomaly signal processor module 310 or sentiment signal processor module 320. Therefore, in these embodiments, only anomaly information 561 or sentiment information 562 would be displayed in signal report 560. Consequently, the specific illustrative example of the type and arrangement of the signal report 560 of FIG. 5B should not be read to limit the embodiments as set forth in the claims.

Figure 5C:
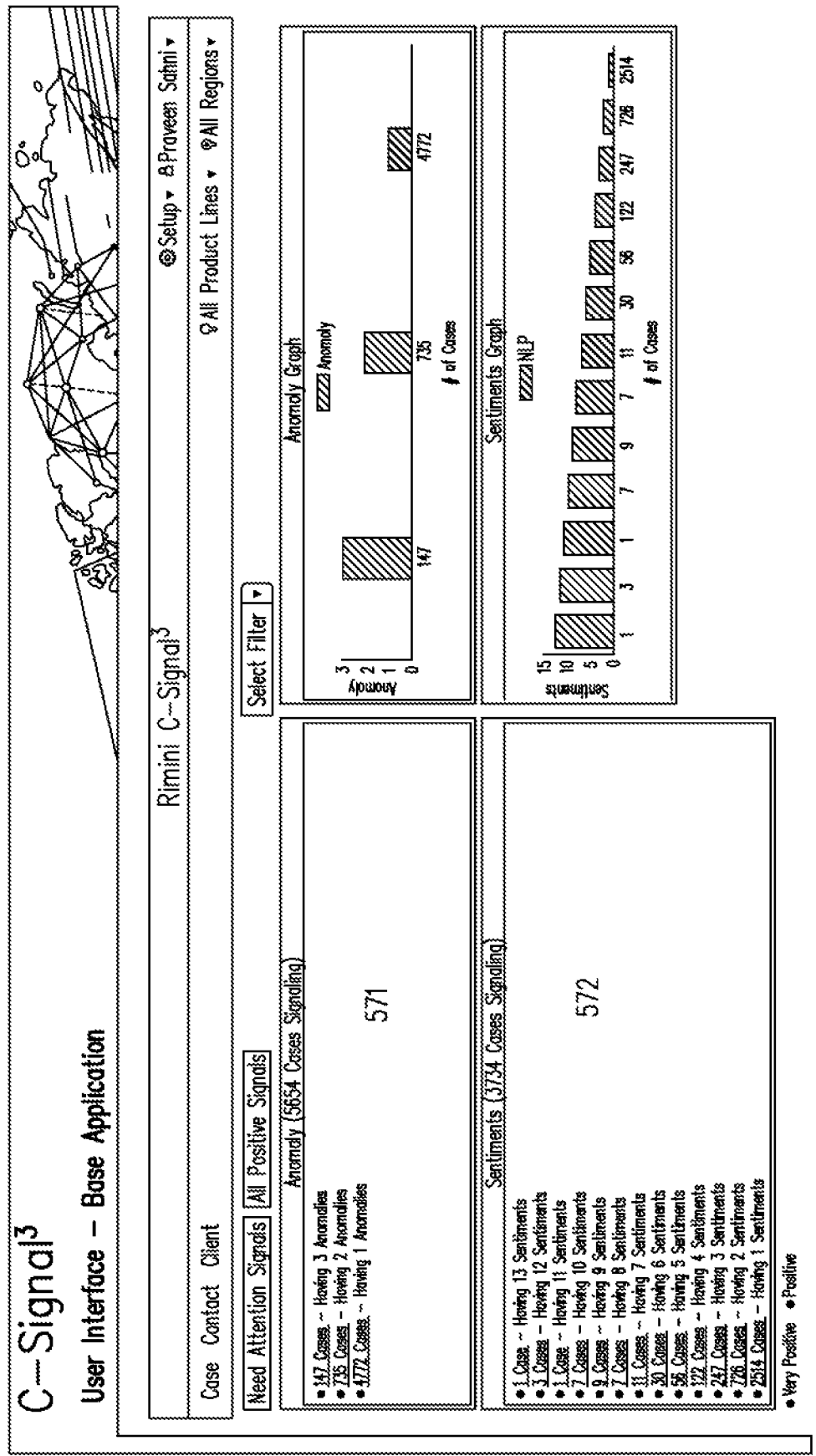
FIG. 5C shows an illustrative example of a signal report generated by the user interface module of FIG. 5A.

FIG. 5C shows an illustrative example of a signal report 570 generated by the user interface module of FIG. 5A.

As seen in FIG. 5C, the signal report 570 depicts positive signals including anomaly information 571 and sentiment information 572. The anomaly information 571 depicts that there are 147 cases having 3 anomalies, 735 cases having 2 anomalies, and 4722 cases having 1 anomaly. The sentiment information 572 depicts that there is 1 case having 13 sentiments, 3 cases having 12 sentiments, 1 case having 11 sentiments, and so on.

Those of ordinary skill in the art will readily recognize that FIG. 5C is but a specific illustrative example of a signal report 570, and that numerous other types and arrangement of such reports are possible and contemplated by the inventors. For instance, a specific illustrative example of a signal report 560 includes both anomaly information 561 and sentiment information 562 indicating that, in this specific illustrative example, signal processor module includes both anomaly signal processor module 310 and sentiment signal processor module 320. However, as noted above, some embodiments, include only anomaly signal processor module 310 or sentiment signal processor module 320. Therefore, in these embodiments, only anomaly information 561 or sentiment information 562 would be displayed in signal report 560. Consequently, the specific illustrative example of the type and arrangement of the signal report 570 of FIG. 5C should not be read to limit the embodiments as set forth in the claims.

Returning to FIG. 5A, the dashboard module 510 provides for filtering cases based on objects of case, contact, and client. The dashboard module 510 provides for filtering cases based on negative signals and positive signals. It is to be understood that the dashboard module 510 may include other filtering criteria such as a product line being supported, a geographic region being supported, and a name of the vector that is desired to be examined.

The dashboard module 510 allows a user to view details about anomalies and sentiments. For example, if a case has seven anomalies detected, then the user can select that case and view the name of each anomaly as well as information about the anomaly, such as a calculated value about the anomaly. For further example, if a case has five sentiments detected, the user can select that case and view each corpus that was detected. Furthermore, the dashboard module 510 can display the comment within which the corpus was detected. For example, a corpus of "unhappy" may be detected as a sentiment. The user can then view the comment that contains this corpus to view the context of the corpus. For example, a comment may be, "I am unhappy with the support you are giving me" that reflects a negative sentiment. The dashboard module 510 also provides for a user determining that a corpus has been incorrectly determined to be a sentiment as a false positive.

FIG. 5D shows an illustrative and non-exhaustive example user interface 580 of sentiment report data 496 identified based on sentiment signals and used for proactive client relationship analysis. As seen in FIG. 5D, the user interface 580 depicts positive sentiment report data 496 including first sentiment display 581 and second sentiment display 582. The first sentiment display 581 illustrates a positive corpus of "appreciated." Here, the word "appreciated" is in reference to a "much appreciated" closing to the text that generally indicates a positive sentiment. In contrast, if the text had been "You are so slow, and a quick reply would be appreciated," then when a user reviews such a sentiment display, the user would recognize that the word "appreciated" would be in relation to a negative sentiment. Accordingly, in this alternative example, a user would designate such a displayed sentiment as a false positive of a positive signal. As another example, the second sentiment display 582 illustrates a positive corpus of "super" that generally indicates a positive sentiment. Here, the word "super" is in reference to "super that you found the cause." Accordingly, a user would not designate this as a false positive.

For example, a comment might be, "I am unhappy that I didn't contact you sooner because you solved my problem so quickly." In this context, the corpus of "unhappy" is a false positive of a negative signal, because the contact of the client is indicating unhappiness with himself rather than the agent. The dashboard module 510 provides for the user to label that corpus as a false positive. After it is labeled, a data scientist can examine the false positive corpus and create training data 191 that can be used to train the sentiment detector model 321.

It is to be understood that a signal may be negative indicating a problem or positive indicating success. For example, FIG. 5B illustrates negative signals and FIG. 5C illustrates positive signals. In addition, there may be friction related signals that indicate that a case is developing the need to be escalated to a senior agent or further escalated in the service provider's hierarchy of contacts, such as to management, indicating an urgency to the signal. The friction related signals may indicate that a contact of the client has provided case text or feedback previously determined to contribute to a negative signal such as having provided low customer survey scores in the past. In this situation, the signals can indicate the need for escalation by the service provider on particular cases naming that client contact.

In one embodiment, the dashboard module 510 displays for a case any signals related to both anomalies and sentiments. For example, the same case may have three anomalies detected by the anomaly signal processor module 310 and two sentiments detected by the sentiment signal processor module 320. It is to be understood that providing both anomalies and sentiments simultaneously by the dashboard module 510 increases the understanding of the problems associated with a case that is being experienced by a client.

The notification module 520 delivers the signal report data 494 as notifications of anomalies and sentiments. A notification is delivered to a user via email, text, dialog boxes, and other notification delivery mechanisms as discussed herein, or as known in the art at the time of filing, or as developed, or becomes available, after the time of filing. Notifications can be personalized to a user so that a user receives notifications about signals that are of interest to the user. For example, a user can request notifications based on certain criteria such as a product line being supported by the service provider or a geographic region being supported by the service provider.

The indicator module 530 interfaces with the client service module 281 of the client service system 180 to provide an indication of the signal report data 494 for the three objects of client, contact, and case. In one embodiment, when an agent sees a signal being indicated within the client service module 281, then the agent can select that signal indicator and be shown more information about that signal.

FIG. 6 shows an illustrative and non-exhaustive example user interface 600 of signal report data 494 used for proactive client relationship analysis. As seen in FIG. 6, the user interface 600 depicts signal report data 494 as signal indicators 601. In the example illustrated by the signal indicators 601, the case status is green, the client status is yellow, and the contact status is red. In this example, the contact may require immediate attention, the client may require slightly less than immediate attention and the case object itself is not exhibiting any signal indicators 601 that indicate the need for immediate attention. It should be understood that other meanings can be assigned to the signal indicators 601 depending upon the desired application.

Those of ordinary skill in the art will readily recognize that FIG. 6 is but a specific illustrative example of signal report data 494, and that numerous other types and arrangement of such data are possible and contemplated by the inventors. Consequently, the specific illustrative example of the type and arrangement of the signal report data 494 of FIG. 6 should not be read to limit the embodiments as set forth in the claims.

FIG. 7 is an example table 700 of vector controls for proactive client relationship analysis. Referring to FIGS. 1, 2A, 3, 4, 5A, 6, and 7 together, the table 700 includes a column 711 that represents vector control fields.

At row 721 of column 711, the vector control field is "Vector Name." Here, the vector name may be any vector name illustrated in FIG. 6 and any other vector name as discussed herein, or as known in the art at the time of filing, or as developed, or becomes available, after the time of filing.

At row 722 of column 711, the vector control field is "Enable." Here, the vector control field indicates whether a vector is enabled to be analyzed or is disabled.

At row 723 of column 711, the vector control field is "Applicable to Object—Case." Here, the vector control field indicates that the vector is to be analyzed for the case object type.

At row 724 of column 711, the vector control field is "Applicable to Object—Contact." Here, the vector control field indicates that the vector is to be analyzed for the contact object type.

At row 725 of column 711, the vector control field is "Applicable to Object—Client." Here, the vector control field indicates that the vector is to be analyzed for the client object type.

At row 726 of column 711, the vector control field is "Applicable to Polarity." Here, the vector control field indicates whether the vector is to be analyzed as a positive signal with a positive value between zero and one, or as a negative signal with a negative value between minus one and zero, or both positive and negative signals, each having a value between minus one and positive one.

At row 727 of column 711, the vector control field is "Vector Type." Here, the vector control field indicates a vector type of anomaly-based-Gaussian, anomaly-based-IQR, average-based, mean-medium-based, sentiments-based, standard-deviation-based, threshold-based, and other vector types as discussed herein, or as known in the art at the time of filing, or as developed, or becomes available, after the time of filing.

At row 728 of column 711, the vector control field is "Forced Low." Here, if the vector type is threshold-based, then the vector control field defines a minimum value for the threshold range.

At row 729 of column 711, the vector control field is "Forced High." Here, if the vector type is threshold-based, then the vector control field defines a maximum value for the threshold range.

At row 730 of column 711, the vector control field is "Weight." Here, the weight of the applicable vector is set within the control data 192 to be utilized by the prioritization module 340 of the signal processor module 130.

Figure 8:
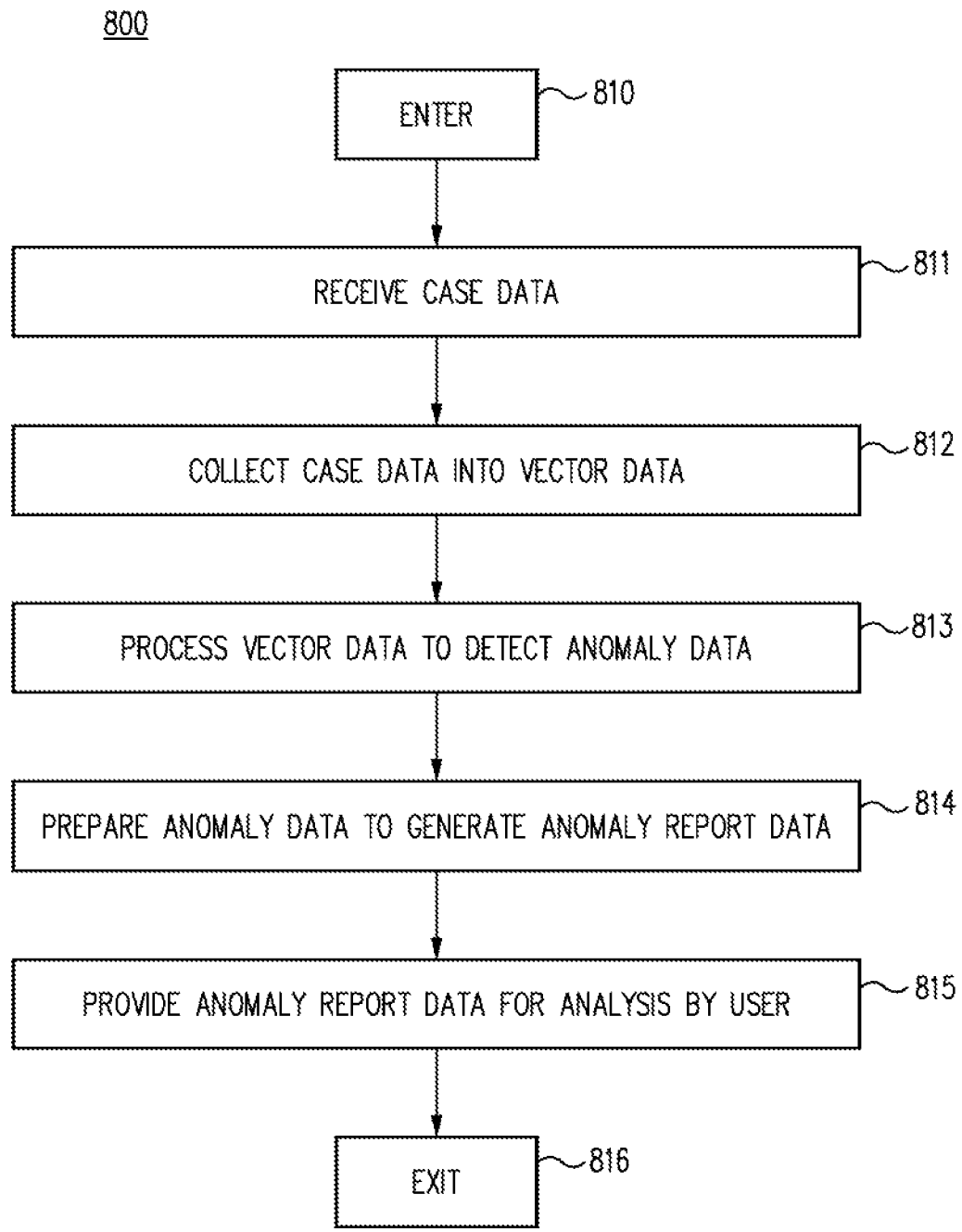
FIG. 8 is a flow diagram of a process for proactive client anomaly detection.

FIG. 8 is a flow diagram of a process 800 for proactive client anomaly detection. Referring to FIGS. 1, 2A, 3, 4, 5A, and 8 together, the process 800 for proactive client anomaly detection begins at operation 810 and the process flow proceeds to operation 811.

At operation 811, case data 282 is received from the client service system 180. The case data 282 is associated with case information of the client service system. The case data 282 represents both structured data and unstructured data of the client service system 180. The data acquisition module 230 of the vector collector module 120 acquires the case data 282 from the client service system 180.

Once the case data 282 is received at operation 811, process flow proceeds to operation 812.

At operation 812, case data 282 is collected into the vector data 193 by the vector collector module 120. The vector data integrator module 210 integrates the case data 282 and the vector data aggregator module 220 aggregates the case data 282 to generate the vector data 193. The vector data integrator module 210 receives integration instructions from the control data 192. The vector data aggregator module 220 receives aggregation instructions from the control data 192.

The control data 192 is modified by a user via the control configuration module 235. In one embodiment, the vector data 193 includes assigning a weight to each vector of the vector data 193 in relation to other vectors of the vector data 193. In one embodiment, each vector of the vector data 193 is defined by a vector type including anomaly-based-Gaussian vector type, anomaly-based-IQR vector type, average-based vector type, mean-medium-based vector type, standard-deviation-based vector type, threshold-based vector type, and other vector types as discussed herein, or as known in the art at the time of filing, or as developed, or becomes available, after the time of filing. For each threshold-based vector data type, a maximum threshold value is assigned, and a minimum threshold value is assigned and stored as control data 192. In one embodiment, each vector of the vector data 193 includes an object type of client object type, contact object type, case object type, and other object types as discussed herein, or as known in the art at the time of filing, or as developed, or becomes available, after the time of filing. The vector data 193 is transmitted to the signal processor module 130 by the vector collector module 120.

Once the case data 282 is collected into the vector data 193 at operation 812, process flow proceeds to operation 813.

At operation 813, the vector data 193 is processed to detect anomaly data 395 by the anomaly signal processor module 310. The anomaly signal processor module 310 includes an anomaly detector model 311 that performs a machine-learning based anomaly detection technique. The anomaly detector model 311 is trained with the training data 191. In one embodiment, the machine-learning based anomaly detection technique is a supervised machine learning-based anomaly detection technique. In one embodiment, the anomaly detector model 311 is trained under a supervised model using training data 191 that is defined by a user of the detection management system 111.

The anomaly signal processor module 310 generates anomaly data 395 from the vector data 193. In one embodiment, the anomaly data 395 comprises at least one anomaly of an anomaly type of point anomaly type, contextual anomaly type, collective anomaly type, and other anomaly types as discussed herein, or as known in the art at the time of filing, or as developed, or becomes available, after the time of filing. In one embodiment, the normalization module 330 normalizes the anomaly data 395 and the prioritization module 340 prioritizes the anomaly data 395. The anomaly data 395 is transmitted to the validation and consolidation module 140 by the signal processor module 130.

Once the vector data 193 is processed to detect anomaly data 395 at operation 813, process flow proceeds to operation 814.

At operation 814, the anomaly data 395 is prepared by the validation and consolidation module 140 to generate anomaly report data 495. In one embodiment, the signal validator module 410 validates the anomaly data 395. In one embodiment, the signal consolidator module 420 consolidates the anomaly data 395. The anomaly report data 495 is transmitted to the user interface module 150 by the validation and consolidation module 140.

Once the anomaly data 395 is prepared by the validation and consolidation module 140 to generate anomaly report data 495 at operation 814, process flow proceeds to operation 815.

At operation 815, the anomaly report data 495 is provided to the user interface module 150 for analysis by a user. In one embodiment, a dashboard module 510 provides a dashboard user interface to display the anomaly report data 495 to the user. In one embodiment, the notification module 520 provides delivery to a user a notification of the anomaly report data 495. In one embodiment, an indicator module 530 provides an indication of the anomaly report data 495 by customizing a user interface screen provided to the user by the client service system based on the anomaly report data 495.

Once the anomaly report data 495 is provided to the user interface module 150 for analysis by a user at operation 815, process flow proceeds to operation 816.

At operation 816, the process 800 is exited.

Figure 9:
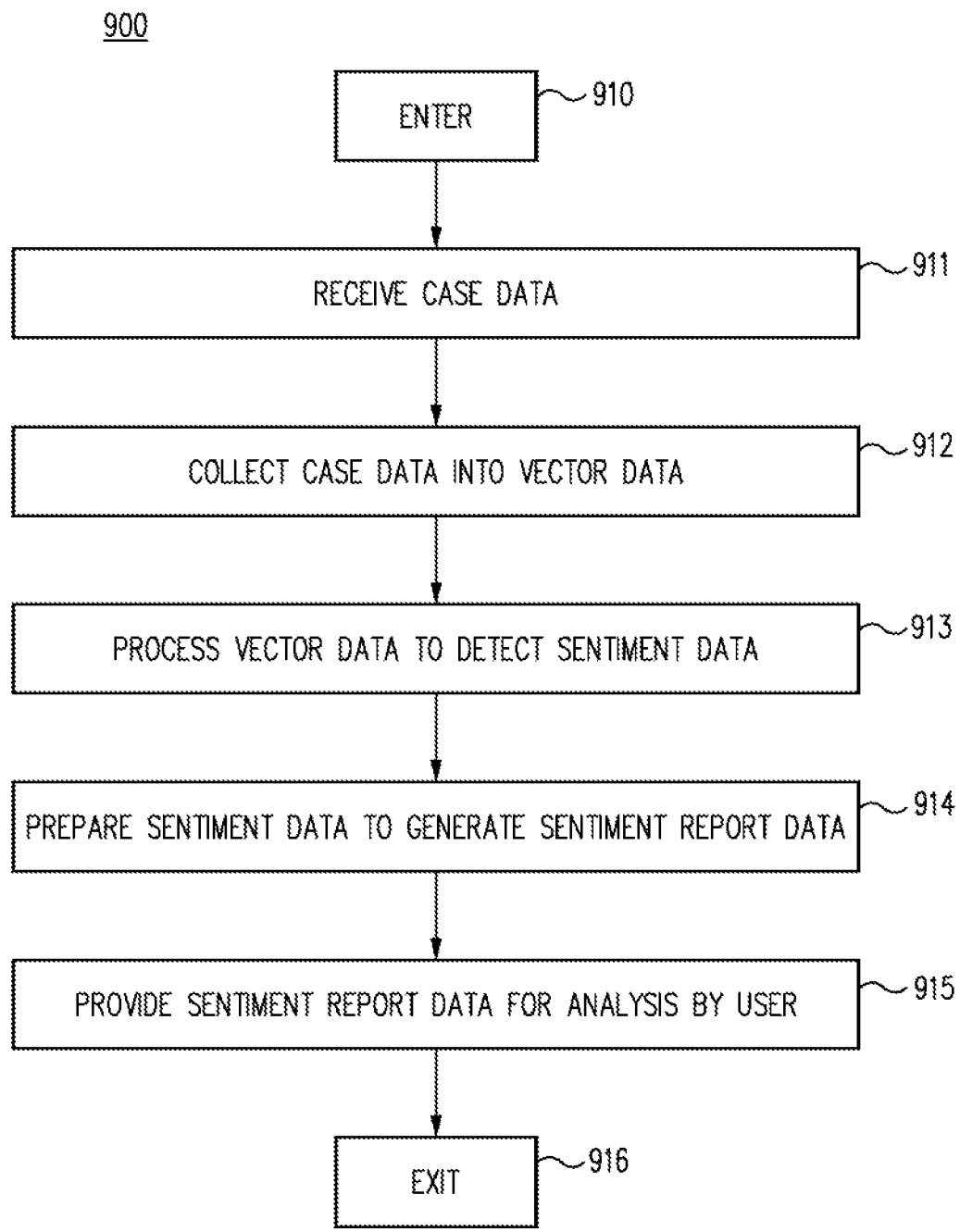
FIG. 9 is a flow diagram of a process for proactive client sentiment detection.

FIG. 9 is a flow diagram of a process 900 for proactive client sentiment detection. Referring to FIGS. 1, 2A, 3, 4, 5A, and 9 together, the process 900 for proactive client sentiment detection begins at operation 910 and process flow proceeds to operation 911.

At operation 911, case data 282 is received from the client service system 180. The case data 282 is associated with case information of the client service system. The case data 282 represents both structured data and unstructured data of the client service system 180. In one embodiment, the case data 282 comprises textual information representing client case conversation information, agent case conversation information, case survey result comment information, and other textual information as discussed herein, or as known in the art at the time of filing, or as developed, or becomes available, after the time of filing. The data acquisition module 230 of the vector collector module 120 acquires the case data 282 from the client service system 180.

Once the case data 282 is received at operation 911, process flow proceeds to operation 912.

At operation 912, case data 282 is collected into the vector data 193 by the vector collector module 120. The vector data integrator module 210 integrates the case data 282 and the vector data aggregator module 220 aggregates the case data 282 to generate the vector data 193. The vector data integrator module 210 receives integration instructions from the control data 192. The vector data aggregator module 220 receives aggregation instructions from the control data 192.

The control data 192 is modified by a user via the control configuration module 235. In one embodiment, each vector of the vector data 193 includes an object type of client object type, contact object type, case object type, and other object types as discussed herein, or as known in the art at the time of filing, or as developed, or becomes available, after the time of filing. The vector data 193 is transmitted to the signal processor module 130 by the vector collector module 120.

Once the case data 282 is collected into the vector data 193 at operation 912, process flow proceeds to operation 913.

At operation 913, the vector data 193 is processed to detect sentiment data 396 by the sentiment signal processor module 320. The sentiment signal processor module 320 includes a sentiment detector model 321 that performs a machine-learning based sentiment detection technique. In one embodiment, the machine-learning based sentiment detection technique includes corpus data representing a plurality of sentiment indications within the vector data 193. The sentiment detector model 321 is trained with the training data 191. In one embodiment, the machine-learning based sentiment detection technique is a supervised machine learning-based sentiment detection technique. In one embodiment, the sentiment detector model 321 is trained under a supervised model using training data 191 that is defined by an engineer of the detection management system 111.

The sentiment signal processor module 320 generates sentiment data 396 from the vector data 193. In one embodiment, the normalization module 330 normalizes the sentiment data 396 and the prioritization module 340 prioritizes the sentiment data 396. The sentiment data 396 is transmitted to the validation and consolidation module 140 by the signal processor module 130.

Once the vector data 193 is processed to detect sentiment data 396 at operation 913, process flow proceeds to operation 914.

At operation 914, the sentiment data 396 is prepared by the validation and consolidation module 140 to generate sentiment report data 496. In one embodiment, a sentiment type of the sentiment data 396 includes a negative sentiment type, a positive sentiment type, an urgency sentiment type, and other sentiment types as discussed herein, or as known in the art at the time of filing, or as developed, or becomes available, after the time of filing. In one embodiment, the signal validator module 410 validates the sentiment data 396. In one embodiment, the signal consolidator module 420 consolidates the sentiment data 396. The sentiment report data 496 is transmitted to the user interface module 150 by the validation and consolidation module 140.

Once the sentiment data 396 is prepared by the validation and consolidation module 140 to generate sentiment report data 496 at operation 914, process flow proceeds to operation 915.

At operation 915, the sentiment report data 496 is provided to the user interface module 150 for analysis by a user. In one embodiment, a dashboard module 510 provides a dashboard user interface to display the sentiment report data 496 to the user. In one embodiment, the notification module 520 provides delivery to a user of a notification of the sentiment report data 496.

In one embodiment, an indicator module 530 provides an indication of the sentiment report data 496 by customizing a user interface screen provided to the user by the client service system based on the sentiment report data 496.

In one embodiment, the user interface module 150 includes allowing the user to designate a sentiment of the sentiment report data 496 as a false positive. In one embodiment, training data is generated from the false positive designation in order to improve the predictiveness of the sentiment detector model 321. In one embodiment, one or more of the sentiments associated with the false positive designation are removed from the sentiment report data 496.

Once the sentiment report data 496 is provided to the user interface module 150 for analysis by a user at operation 915, process flow proceeds to operation 916.

At operation 916, the process 900 is exited.

Figure 10:
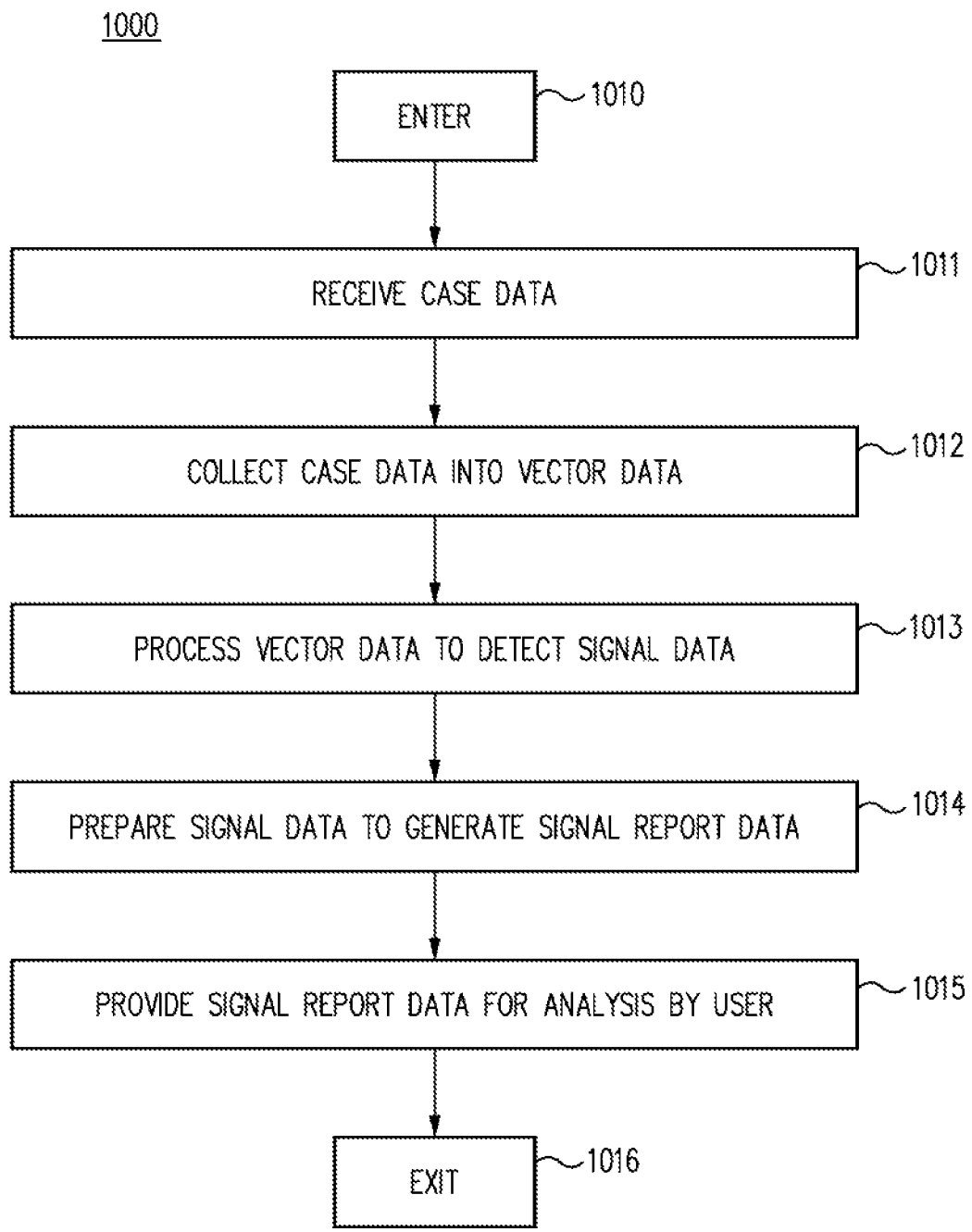
FIG. 10 is a flow diagram of a process for proactive client relationship analysis.

FIG. 10 is a flow diagram of a process 1000 for proactive client relationship analysis. Referring to FIGS. 1, 2A, 3, 4, 5A, and 10 together, the process 1000 for proactive client relationship analysis begins at operation 1010 and process flow proceeds to operation 1011.

At operation 1011, case data 282 is received from the client service system 180. The case data 282 is associated with case information of the client service system. The case data 282 represents both structured data and unstructured data of the client service system 180. The data acquisition module 230 of the vector collector module 120 acquires the case data 282 from the client service system 180.

Once the case data 282 is received at operation 1011, process flow proceeds to operation 1012.

At operation 1012, case data 282 is collected into the vector data 193 by the vector collector module 120. The vector data integrator module 210 integrates the case data 282 and the vector data aggregator module 220 aggregates the case data 282 to generate the vector data 193. The vector data integrator module 210 receives integration instructions from the control data 192. The vector data aggregator module 220 receives aggregation instructions from the control data 192. The control data 192 is modified by a user via the control configuration module 235.

In one embodiment, each vector of the vector data 193 is defined by a vector type including sentiment-based vector type, anomaly-based-Gaussian vector type, anomaly-based-IQR vector type, average-based vector type, mean-medium-based vector type, standard-deviation-based vector type, threshold-based vector type, and other vector types as discussed herein, or as known in the art at the time of filing, or as developed, or becomes available, after the time of filing. In one embodiment, each vector of the vector data 193 includes an object type of client object type, contact object type, case object type, and other object types as discussed herein, or as known in the art at the time of filing, or as developed, or becomes available, after the time of filing. The vector data 193 is transmitted to the signal processor module 130 by the vector collector module 120.

Once the case data 282 is collected into the vector data 193 at operation 1012, process flow proceeds to operation 1013.

At operation 1013, the vector data 193 is processed to detect signal data 194 by the signal processor module 130. The signal processor module 130 generates signal data 194 from the vector data 193. The signal data 194 includes anomaly data 395, sentiment data 396, and other signal data as discussed herein, or as known in the art at the time of filing, or as developed, or becomes available, after the time of filing. In one embodiment, the normalization module 330 normalizes the signal data 194 and the prioritization module 340 prioritizes the signal data 194. The signal data 194 is transmitted to the validation and consolidation module 140 by the signal processor module 130.

Once the vector data 193 is processed to detect signal data 194 at operation 1013, process flow proceeds to operation 1014.

At operation 1014, the signal data 194 is prepared by the validation and consolidation module 140 to generate signal report data 494. In one embodiment, the signal validator module 410 validates the signal data 194. In one embodiment, the signal consolidator module 420 consolidates the signal data 194. The signal report data 494 is transmitted to the user interface module 150 by the validation and consolidation module 140.

Once the signal data 194 is prepared by the validation and consolidation module 140 to generate signal report data 494 at operation 1014, process flow proceeds to operation 1015.

At operation 1015, the signal report data 494 is provided to the user interface module 150 for analysis by a user. In one embodiment, a dashboard module 510 provides a dashboard user interface to display the signal report data 494 to the user. In one embodiment, the notification module 520 provides delivery to a user of a notification of the signal report data 494. In one embodiment, an indicator module 530 provides an indication of the signal report data 494 by customizing a user interface screen provided to the user by the client service system based on the signal report data 494.

Once the signal report data 494 is provided to the user interface module 150 for analysis by a user at operation 1015, process flow proceeds to operation 1016.

At operation 1016, the process 1000 is exited.

Embodiments of the present disclosure provide highly efficient, effective, and versatile systems and methods for proactive client relationship analysis. However, the disclosed embodiments do not encompass, embody, or preclude other forms of innovation in the area of anomaly detection systems and methods.

In addition, the disclosed embodiments of systems and methods for proactive client relationship analysis are not abstract ideas for at least several reasons.

First, the disclosed systems and methods for proactive client relationship analysis are not abstract ideas because they are not merely an idea itself (e.g., can be performed mentally or using pen and paper). For example, with a traditional client service system, the amount of unstructured data of comments of thousands of cases is immense because service provider agents and client contacts regularly deliver text messages to each other. It is infeasible for a manager of the service provider to read all the comments and search for certain words that indicate there is a client sentiment to be explored. For further example, with a traditional client service system, the amount of structured data of thousands of cases is likewise immense as service provider agents update the fields with information related to the resolution of each case. It is infeasible for a manager of the service provider to review all the structured data and compare the structured data across various cases. In contrast, the disclosed embodiments utilize machine learning algorithms to detect sentiments within unstructured data and anomalies within structured data. Due to the large amount of such unstructured data and structured data, the human mind cannot make such detections even with the aid of pen and paper.

Second, the disclosed systems and methods for proactive client relationship analysis are not abstract ideas because they are not a method of organizing human activity such as fundamental economic principles or practices (including hedging, insurance, mitigating risk); commercial or legal interactions (including agreements in the form of contracts; legal obligations; advertising, marketing or sales activities or behaviors; business relations); and interactions between people (including social activities, teaching, and following rules or instructions). In contrast, the disclosed embodiments perform machine learning model analysis to provide a detection of a signal of an interaction of a client with an agent. Providing detections of a signal for use by a service provider, using the disclosed embodiments, allows a service provider to provide better service to the client by allowing the service provider to troubleshoot issues before they cause a client to look for services from a different service provider. The disclosed embodiments improve a service provider's managers the ability to uncover issues that are opaque to the managers of the service provider, which is not organizing human activity.

Third, although mathematics may be used in the disclosed systems and methods for proactive client relationship analysis, the disclosed and claimed systems and methods are not abstract ideas because they are not simply a mathematical relationship/formula. In contrast, utilization of the disclosed embodiments results in the tangible effect of enabling machine learning models to operate on vector data in order to determine a signal of an anomaly or a sentiment. Such signals are provided to a user of a service provider to improve the business viability of the service provider. Such is not simply a mathematical relationship/formula.

In addition, the disclosed systems and methods describe a practical application to improve the art of signal detection by providing a technical solution to the technical problem of proactively detecting client signals.

In the discussion above, certain aspects of some embodiments include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or omitted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below. Therefore, numerous variations, whether explicitly provided for by the specification or implied by the specification or not, may be implemented by one of skill in the art in view of this disclosure.

What is claimed is:

1. A computing system implemented method for arranging user interface elements of a computer system based on signals detected in case data comprising:
    providing a machine learning-based data signal detection system including:
        an anomaly signal processor module to detect anomalous signals and a sentiment signal processor module to detect sentiment-based signals, wherein the anomaly signal processor module and the sentiment signal processor module operate independently of one another, and further wherein the anomaly signal processor module includes one or more machine learning anomaly detection models;
        a vector collector module;
        a validation and consolidation module; and
        a user interface module;
    collecting, using the vector collector module, historical case data representing objective data associated with a plurality of closed cases from one or more client service systems, wherein the historical case data includes structured historical case data, and further wherein the vector collector module integrates and aggregates the structured historical case data to generate historical case vector data;
    training, using the historical case vector data, the one or more machine learning anomaly detection models of the anomaly signal processor module to objectively detect anomalous signals in structured case data;
    collecting, using the vector collector module, current case data representing objective data associated with one or more open client cases associated with one or more clients of a service provider, wherein the current case data includes structured current case data, and further wherein the vector collector module integrates and aggregates the structured current case data in relative real-time to generate current case vector data;
    providing the current case vector data to the trained one or more machine learning anomaly detection models of the anomaly signal processor module;
    identifying, using the current case vector data and the trained one or more machine learning anomaly detection models, in relative real-time, one or more anomalous signals in the structured current case data for one or more specific current client cases, wherein the identification of the one or more anomalous signals is not dependent on prior identification of sentiment-based signals;
    automatically identifying, using the trained one or more machine learning anomaly detection models, anomalous signals that are negative anomalous signals and anomalous signals that are positive anomalous signals;
    generating, using the trained one or more machine learning anomaly detection models, anomaly signal data representing data associated with the one or more identified negative and positive anomalous signals;
    processing, using the validation and consolidation module, the generated anomaly signal data to determine whether the one or more anomalous signals represented by the anomaly signal data are valid anomalous signals;
    generating, using the validation and consolidation module, validated anomaly signal data representing data associated with the one or more anomalous signals determined to be valid anomalous signals;
    automatically separating, using the validation and consolidation module, cases with negative anomalous signals from cases with positive anomalous signals;
    automatically determining, using the validation and consolidation module, that one or more of the open client cases with negative anomalous signals needs attention;
    automatically generating, using the user interface module, an anomaly signal report in relative real-time, the anomaly signal report including one or more graphical user interface elements utilized to visually depict the validated anomaly signal data associated with the cases that need attention, wherein generating the anomaly signal report includes customizing a user interface screen of the user interface module by automatically arranging the graphical user interface elements included in the anomaly signal report based on the validated anomaly signal data; and automatically displaying, using the user interface module, the customized user interface screen to an agent for the service provider.

2. The computing system implemented method of claim 1, wherein in the generation of the historical case vector data, a weight is assigned to each vector of the historical case vector data in relation to other vectors of the historical case vector data.

3. The computing system implemented method of claim 1, wherein in the generation of the historical case vector data, a vector type is assigned to each vector of the historical case vector data, a vector type selected from the group of vector types consisting of:
- an anomaly-based-Gaussian vector type;
- an anomaly-based-IQR vector type;
- an average-based vector type;
- a mean-medium-based vector type;
- a standard-deviation-based vector type; and
- a threshold-based vector type.

4. The computing system implemented method of claim 3, wherein the threshold-based vector data type includes assigning one of a maximum threshold value, a minimum threshold value, and a combination of the foregoing.

5. The computing system implemented method of claim 1, wherein in the generation of the historical case vector data, an object type is assigned to each vector of the historical case vector data, wherein the object type comprises one of client object type, contact object type, and case object type.

6. The computing system implemented method of claim 1, wherein the one or more machine learning anomaly detection models include a supervised machine learning anomaly detection model.

7. The computing system implemented method of claim 1, wherein the one or more anomalous signals include at least one anomaly type selected from the group of anomaly types consisting of:
- a point anomaly type;
- a contextual anomaly type; and
- a collective anomaly type.

8. The computing system implemented method of claim 1, wherein:
- the anomaly signal report includes an anomaly feedback feature for each of the one or more validated anomalous signals associated with the one or more current client cases; and
- the anomaly feedback feature included in the anomaly signal report is utilized to generate refined training data for further training the one or more machine learning anomaly detection models of the machine learning-based data signal detection system.

9. The computing system implemented method of claim 1, wherein one or more corrective actions are taken, including escalating one or more of the open client cases.

10. The computing system implemented method of claim 9 wherein escalating one or more of the open client cases includes reassigning one or more of the open client cases to a second agent in the service provider's hierarchy of contacts.

11. A computing system implemented method for arranging user interface elements of a computer system based on signals detected in case data comprising:
providing a machine learning-based data signal detection system including:
an anomaly signal processor module to detect anomalous signals and a sentiment signal processor module to detect sentiment-based signals, wherein the anomaly signal processor module and the sentiment signal processor module operate independently of one another, and further wherein the sentiment signal processor module includes one or more machine learning-based language processing models;
a vector collector module;
a validation and consolidation module; and
a user interface module;
collecting, using the vector collector module, historical case data representing objective data associated with a plurality of closed cases from one or more client service systems, wherein the historical case data includes unstructured historical case data, and further wherein the vector collector module integrates and aggregates the unstructured historical case data to generate historical case vector data;
training, using the historical case vector data, the one or more machine learning-based language processing models of the sentiment signal processor module to objectively detect sentiment-based signals in unstructured case data;
collecting, using the vector collector module, current case data representing objective data associated with one or more open client cases associated with clients of a service provider, wherein the current case data includes unstructured current case data, and further wherein the vector collector module integrates and aggregates the unstructured current case data in relative real-time to generate current case vector data;
providing the current case vector data to one or more machine learning-based language processing models of the sentiment signal processor module;
identifying, using the current case vector data and the trained one or more machine learning-based language processing models, in relative real-time, one or more sentiment-based signals in the unstructured current case data for one or more specific current client cases, wherein the identification of the one or more sentiment-based signals is not dependent on prior identification of anomalous signals;
automatically identifying, using the trained one or more machine learning-based language processing models, sentiment-based signals that are negative sentiment-based signals and sentiment-based signals that are positive sentiment-based signals;
generating, using the trained one or more machine learning-based language processing models, sentiment signal data representing data associated with the one or more identified negative and positive sentiment-based signals;
processing, using the validation and consolidation module, the generated sentiment signal data to determine whether the one or more sentiment-based signals represented by the sentiment signal data are valid sentiment-based signals;
generating, using the validation and consolidation module, validated sentiment signal data representing data associated with the sentiments determined to be valid sentiment-based signals;
automatically separating, using the validation and consolidation module, cases with negative sentiment-based signals from cases with positive sentiment-based signals;
automatically determining, using the validation and consolidation module, that one or more of the open client cases with negative sentiment-based signals needs attention;

automatically generating, using the user interface module, a sentiment signal report in relative real-time, the sentiment signal report including one or more graphical user interface elements utilized to visually depict the validated sentiment signal data associated with the cases that need attention, wherein generating the sentiment signal report includes customizing a user interface screen of the user interface module by automatically arranging the graphical user interface elements included in the signal report based on the validated signal data; and automatically displaying, using the user interface module, the customized user interface screen to an agent for the service provider.

12. The computing system implemented method of claim 11, wherein the current case data includes textual data representing one or more of client case conversation data, agent case conversation data, and case survey result comment data.

13. The computing system implemented method of claim 11, wherein the one or more machine learning-based language processing models includes corpus data representing a plurality of sentiment indications.

14. The computing system implemented method of claim 11, wherein the sentiment signal report includes a sentiment feedback feature for each of the one or more validated sentiment-based signals associated with the listed one or more specific current client cases.

15. The computing system implemented method of claim 14, wherein the sentiment feedback feature included in the sentiment signal report is utilized to generate refined training data for further training the one or more machine learning-based language processing models of the machine learning-based data signal detection system.

16. The computing system implemented method of claim 11, wherein one or more of the sentiment-based signals associated with one or more current client cases is a negative sentiment type.

17. The computing system implemented method of claim 11, wherein one or more of the sentiment-based signals associated with one or more current client cases is a positive sentiment type.

18. The computing system implemented method of claim 11, wherein one or more of the sentiment-based signals associated with one or more current client cases is an urgency sentiment type.

19. The computing system implemented method of claim 11, wherein one or more of the sentiment-based signals is removed from the sentiment signal report when the one or more sentiment-based signals are associated with false sentiment feedback.

20. The computing system implemented method of claim 11, wherein in the generation of the current case vector data, a weight is assigned to each vector of the current case vector data in relation to other vectors of the current case vector data.

21. The computing system implemented method of claim 11, wherein one or more corrective actions are taken, including escalating one or more of the open client cases.

22. The computing system implemented method of claim 21 wherein escalating one or more of the open client cases includes reassigning one or more of the open client cases to a second agent in the service provider's hierarchy of contacts.

23. A computing system implemented method for arranging user interface elements of a computer system based on signals detected in case data comprising:

providing a machine learning-based data signal detection system including:
an anomaly signal processor module to detect anomalous signals and a sentiment signal processor module to detect sentiment-based signals, wherein the anomaly signal processor module and the sentiment signal processor module operate independently of one another;
a vector collector module;
one or more machine learning models;
a validation and consolidation module; and
a user interface module;

collecting, using the vector collector module, historical case data representing data associated with a plurality of closed client cases from one or more client service systems wherein the historical case data includes both structured and unstructured historical case data, and further wherein the vector collector module integrates and aggregates both the structured and unstructured historical case data to generate historical case vector data;

training, using the historical case vector data, the one or more machine learning models to objectively detect anomalous signals in structured case data and sentiment-based signals in unstructured case data, wherein the machine learning model used to detect anomalous signals is a machine learning anomaly detection model, and the machine learning model used to detect sentiment-based signals is a machine learning-based language processing model;

collecting, using the vector collector module, current case data representing data associated with one or more open client cases associated with one or more clients of a service provider, wherein the current case data includes both structured and unstructured current case data, and further wherein the vector collector module integrates and aggregates both the structured and unstructured current case data in relative real-time to generate current case vector data;

providing the current case vector data to the trained one or more machine learning models of the machine learning-based data signal detection system;

identifying, using the current case vector data and the trained one or more machine learning models, in relative real-time, one or more anomalous signals and one or more sentiment-based signals in the current case data for one or more specific current client cases, wherein the identification of the one or more anomalous signals is not dependent on the identification of the one or more sentiment-based signals, and the identification of the one or more sentiment-based signals is not dependent on the identification of the one or more anomalous signals;

automatically identifying, using the trained one or more machine learning models, anomalous signals that are negative anomalous signals and anomalous signals that are positive anomalous signals;

automatically identifying, using the trained one or more machine learning models, sentiment-based signals that are negative sentiment-based signals and sentiment-based signals that are positive sentiment-based signals;

processing, using the validation and consolidation module, the generated signal data to determine whether the one or more signals represented by the signal data are valid signals;

generating, using the validation and consolidation module, validated signal data representing data associated with the signals determined to be valid signals;

automatically separating, using the validation and consolidation module, cases with negative signals from cases with positive signals;

automatically determining, using the validation and consolidation module, that one or more of the open client cases with negative signals needs attention;

automatically generating, using the user interface module, a signal report, in relative real-time, the signal report including one or more graphical user interface elements utilized to visually depict the validated signal data associated with the cases that need attention, wherein generating the signal report includes customizing a user interface screen of the user interface module by automatically arranging the graphical user interface elements included in the signal report based on the validated signal data; and automatically displaying, using the user interface module, the customized user interface screen to an agent for the service provider.

24. The computing system implemented method of claim 23, wherein in the generation of the historical case vector data, a weight is assigned to each vector of the historical case vector data in relation to other vectors of the historical case vector data.

25. The computing system implemented method of claim 23, wherein in the generation of the historical case vector data, a vector type is assigned to each vector of the historical case vector data, a vector type selected from the group of vector types consisting of:
- an anomaly-based-Gaussian vector type;
- an anomaly-based-IQR vector type;
- an average-based vector type;
- a mean-medium-based vector type;
- a standard-deviation-based vector type; and
- a threshold-based vector type.

26. The computing system implemented method of claim 25, wherein the threshold-based vector data type includes assigning one of a maximum threshold value, a minimum threshold value, and a combination of the foregoing.

27. The computing system implemented method of claim 23, wherein in the generation of the historical case vector data, an object type is assigned to each vector of the historical case vector data, wherein the object type comprises one of client object type, contact object type, and case object type.

28. The computing system implemented method of claim 23, wherein the one or more machine learning models include a supervised machine learning model.

29. The computing system implemented method of claim 23, wherein the one or more anomalous signals include at least one anomaly type selected from the group of anomaly types consisting of:
- a point anomaly type;
- a contextual anomaly type; and
- a collective anomaly type.

30. The computing system implemented method of claim 23, wherein the current case data includes textual data representing one or more of client case conversation data, agent case conversation data, and case survey result comment data.

31. The computing system implemented method of claim 23, wherein the one or more machine learning models includes corpus data representing a plurality of sentiment indications.

32. The computing system implemented method of claim 23, wherein the signal report includes a signal feedback feature for each of the one or more validated signals associated with the one or more cases that need attention.

33. The computing system implemented method of claim 32, wherein the signal feedback feature included in the signal report is utilized to generate refined training data for further training the one or more machine learning models of the machine learning-based data signal detection system.

34. The computing system implemented method of claim 23, wherein the one or more sentiment-based signals is a negative sentiment type.

35. The computing system implemented method of claim 23, wherein the one or more sentiment-based signals is a positive sentiment type.

36. The computing system implemented method of claim 23, wherein the one or more sentiment-based signals is an urgency sentiment type.

37. The computing system implemented method of claim 23, wherein one or more of the signals is removed from the signal report when the one or more signals are associated with false signal feedback.

38. The computing system implemented method of claim 23, wherein one or more corrective actions are taken, including reassigning one or more of the open client cases to a second agent in the service provider's hierarchy of contacts.

* * * * *